US008654008B2

(12) United States Patent
Zhou et al.

(10) Patent No.: US 8,654,008 B2
(45) Date of Patent: Feb. 18, 2014

(54) MULTI-STAGE GLONASS/GPS AUTOMATIC FREQUENCY CONTROL

(75) Inventors: Hao Zhou, Mountain View, CA (US); Qinfang Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 12/894,067

(22) Filed: Sep. 29, 2010

(65) Prior Publication Data

US 2012/0075142 A1    Mar. 29, 2012

(51) Int. Cl.
*G01S 19/29* (2010.01)
*G01S 19/21* (2010.01)

(52) U.S. Cl.
USPC .................. 342/357.59; 342/357.68

(58) Field of Classification Search
USPC ............. 342/357.37, 357.59, 357.68, 357.75; 701/468
See application file for complete search history.

(56) References Cited

U.S. PATENT DOCUMENTS

| 6,738,429 | B1 | 5/2004 | Bourdeau |
| 6,959,057 | B1 | 10/2005 | Tuohino |

| 2003/0152134 | A1 | 8/2003 | Vorobiev et al. |
| 2004/0252049 | A1 | 12/2004 | Vantalon et al. |
| 2009/0040103 | A1 | 2/2009 | Chansarkar et al. |

FOREIGN PATENT DOCUMENTS

WO      WO 2009073522 A1 *  6/2009

OTHER PUBLICATIONS

International Search Report and Written Opinion—PCT/US2011/051628—ISA/EPO—Jan. 18, 2012.

\* cited by examiner

*Primary Examiner* — Dao Phan
(74) *Attorney, Agent, or Firm* — Bever, Hoffman & Harms, LLP

(57) ABSTRACT

A method of providing automatic frequency control pull-in for efficient receipt of GLONASS bits is described. This method can include first determining whether a channel noise (CNo) is greater than or equal to a predetermined value. When the CNo is greater than or equal to the predetermined value, the pull-in can be performed using a first series of predetection integration periods (PDIs) with activated decision-directed flips (DDFs) until a 20 ms boundary of a GLONASS data bit is found. When the CNo is less than the predetermined value, the pull-in can be performed using a second series of PDIs with always deactivated DDFs. A similar method of providing automatic frequency control pull-in for efficient receipt of GPS bits is also described.

40 Claims, 22 Drawing Sheets

MULTI-STAGE GLONASS/GPS AUTOMATIC FREQUENCY CONTROL

BACKGROUND OF THE INVENTION

1. Field of the Invention

The present invention relates to global location satellite systems and in particular to automatic frequency control for GLONASS or GPS.

2. Related Art

GPS (global positioning system) and GLONASS (global navigation satellite system) are radio-based satellite systems in operation today. To provide global coverage, GPS uses between 24-32 satellites. Assuming the minimum number of 24 satellites, 4 satellites are deployed in each of six orbits. The six orbital planes' ascending nodes are separated by 60 degrees. In this configuration, a minimum of six satellites should be in view from any given point at any time. To provide global coverage, GLONASS includes 24 satellites, wherein 21 satellites can be used for transmitting signals and 3 satellites can be used as spares. The 24 satellites are deployed in three orbits, each orbit having 8 satellites. The three orbital planes' ascending nodes are separated by 120 degrees. In this configuration, a minimum of five satellites should be in view from any given point at any time.

Both GPS and GLONASS broadcast two signals: a coarse acquisition (C/A code) signal and a precision (P code) signal. In general, global position devices, called receivers herein, lock onto the C/A transmission and not the P transmission. The P transmission is much longer than the C/A transmission and therefore is impractical to lock onto, e.g. by using synchronization. Once a lock is established via C/A transmission, the C/A transmission itself can provide a quick P lock.

The C/A codes for GPS and GLONASS, which can be generated as a modulo-2 sum of two maximum length shift register sequences, are selected for good cross-correlation properties. Each GPS satellite transmits its own unique C/A code, which has an identifiable pseudo-random noise code number (PRN#). In contrast, each GLONASS satellite transmits the same C/A code, and is identified by its channel number (CHN#).

The C/A code includes navigation data, which provides information about the exact location of the satellite, the offset and drift of its on-board atomic clock, and information about other satellites in the system. In GPS, the C/A format for the navigation data includes words, frames, and subframes. The words are 30 bits long; ten words form one subframe; and five subframes form one frame. In GPS, the C/A code is 1023 bits long, is transmitted at 1.023 Mbps, and therefore has a repetition period of 1 ms. In GLONASS, the C/A format is strings, wherein each string includes 1.7 sec of navigation data and 0.3 sec of a time mark sequence. Notably, the C/A code in GLONASS is 511 bits long, is transmitted at 511 kbps, and therefore has the same code repetition period (i.e. 1 ms) as GPS.

FIG. 1A illustrates a GLONASS string 100 including 85 data bits in bi-binary code and 30 bits of time mark. FIG. 1B shows the 85 data bits in both relative code (101) (having a 20 ms period) before encoding and in bi-binary code (102) after encoding. Note that the encoding is a modulation of the relative code by a meander sequence (103), which changes polarity every 10 ms, as shown by clock pulses 104). Therefore, bi-binary code 102 has an effective data bit duration of 10 ms.

FIG. 1B shows the 30 bits of the time mark (105) aligned with the 85 data bits for comparison. As shown, each of the 30 time mark bits is 10 ms long. The 30 bits of the time mark pattern are [111110001101110101000010010110]. The time mark is provided to facilitate time synchronization of the satellite's atomic clock to the receiver's local clock.

With the advent of GLONASS satellites now being available to provide position information, it is desirable to have a system that includes the capability of using GPS and/or GLONASS signals for position determination. Therefore, a need arises for a method for receiving both GPS and GLONASS signals.

SUMMARY OF THE INVENTION

A method of providing automatic frequency control pull-in for efficient receipt of GLONASS bits is described. This method can include first determining whether a channel noise (CNo) is greater than or equal to a predetermined value (e.g. 30 dB-Hz). When the CNo is greater than or equal to the predetermined value, the pull-in can be performed using a first series of predetection integration periods (PDIs) with activated decision-directed flips (DDFs) until a 20 ms boundary of a GLONASS data bit is found. This operation can be used because for a strong signal, the signal polarity difference between the adjacent PDI pairs are easily detectable and thus its effect on the frequency discrimination can be removed by flipping the sign of the product of the two PDI pairs. The AFC discriminator performance is improved by the DDF operation.

Using the first series of PDIs and activated DDFs can include proceeding to a next step only when predetermined conditions are met. For example, an initial step, which includes a PDI of 1 ms, can transition to a first step when a first test condition is met. This first test condition can include satisfying a dot count test and a transition decision test using frequency error estimation. The first step, which includes a PDI of 2 ms, can transition to a second step when the first test condition is again met. The second step, which includes a PDI of 5 ms, can transition to a third step when the first test condition is met and a 10 ms GLONASS bit boundary is detected. The third step, which includes a PDI of 10 ms, can transition to a fourth step when the 20 ms GLONASS bit boundary and time-marker are found. The fourth step can include deactivating the DDF, because cross bit boundary PDI pairs are excluded from the AFC discriminator after 20 ms boundary and time mark are detected.

When the CNo is less than the predetermined value, the pull-in can use a second series of PDIs with always deactivated DDFs. Using the second series of PDIs and deactivated DDFs can similarly include proceeding to a next step only when predetermined conditions are met. For example, an initial step, which includes a PDI of 2 ms, can transition to a first step when a second test condition is met and a 10 ms GLONASS bit boundary is detected. This second test condition can include a frequency lock test. The first step, which includes a PDI of 5 ms, can transition to a second step when the second test condition is met and the 20 ms GLONASS bit boundary and/or time-marker are detected. The second step can include a PDI of 10 ms. Note that DDF is not applied for a weak signal because the decision of the signal polarity changes between the adjacent PDI pairs is prone to errors. Thus, applying DDF for a weak signal can degrade the AFC discriminator performance.

A method of providing automatic frequency control pull-in for efficient receipt of GPS bits is also described. This method can include first determining whether a channel noise (CNo) is greater than or equal to a first predetermined value (e.g. 29 dB-Hz). When the CNo is greater than or equal to the first predetermined value, the pull-in can be performed using a first series of predetection integration periods (PDIs) with activated decision-directed flips (DDFs) until a bit synchronization is achieved.

Using the first series of PDIs and activated DDFs can include proceeding to a next step only when predetermined conditions are met. For example, an initial step, which includes a PDI of 1 ms, can transition to a first step when a first test condition is met. This first test condition can include satisfying a dot count test and a transition decision test using frequency error estimation. The first step, which includes a PDI of 2 ms, can transition to a second step when the first test condition is again met. The second step, which includes a PDI of 5 ms, can transition to a third step when the first test condition is met and the bit synchronization is achieved. The third step includes a PDI of 10 ms and deactivating the DDF.

In one embodiment, preceding the initial step, a determination can be made whether the CNo is greater than a second predetermined value, which is higher than the first predetermined value (e.g. 40 dB-Hz). When the CNo is greater than the second predetermined value, then the technique can proceed to the initial step. When the CNo is less than or equal to the second predetermined value, then the technique can further include determining whether the CNo is greater than or equal to a third predetermined value, which is between the first predetermined value and the second predetermined value (e.g. 32 dB-Hz). When the CNo is greater than or equal to the third predetermined value, then the technique can proceed to the first step. When the CNo is less than the third predetermined value, then the technique can proceed to the second step.

When the CNo is less than the first predetermined value, the pull-in can use a second series of PDIs with always deactivated DDFs. Using the second series of PDIs and deactivated DDFs can similarly include proceeding to a next step only when predetermined conditions are met. For example, an initial step, which includes a PDI of 2 ms, can transition to a first step when a second test condition is met and a 10 ms GLONASS bit boundary is detected. This second test condition can include a frequency lock test. The first step, which includes a PDI of 5 ms, can transition to a second step when the second test condition is met and the bit synchronization is achieved. The second step can include a PDI of 10 ms.

BRIEF DESCRIPTION OF THE FIGURES

FIG. 3 illustrates an exemplary stage I analysis of data bits with PDI=5 ms and DDF ON.

FIG. 19 illustrates an exemplary a two-mode, four-stage method for a GLONASS AFC pull-in.

FIG. 24 illustrates an exemplary a two-mode, three-stage method for a GPS AFC pull-in.

DETAILED DESCRIPTION OF THE FIGURES

An automatic frequency control (AFC) design for both GPS and GLONASS is described below. Notably, GPS and GLONASS have similar signal formats after the time mark and meander sequence detection in GLONASS. This similar format facilitates the integration of the two global positioning systems into one platform. As described in further detail below, the pull-in procedure of the GLONASS AFC can be adjusted to take into account the meander sequence and the time mark sequence unique for GLONASS.

Figure 1:
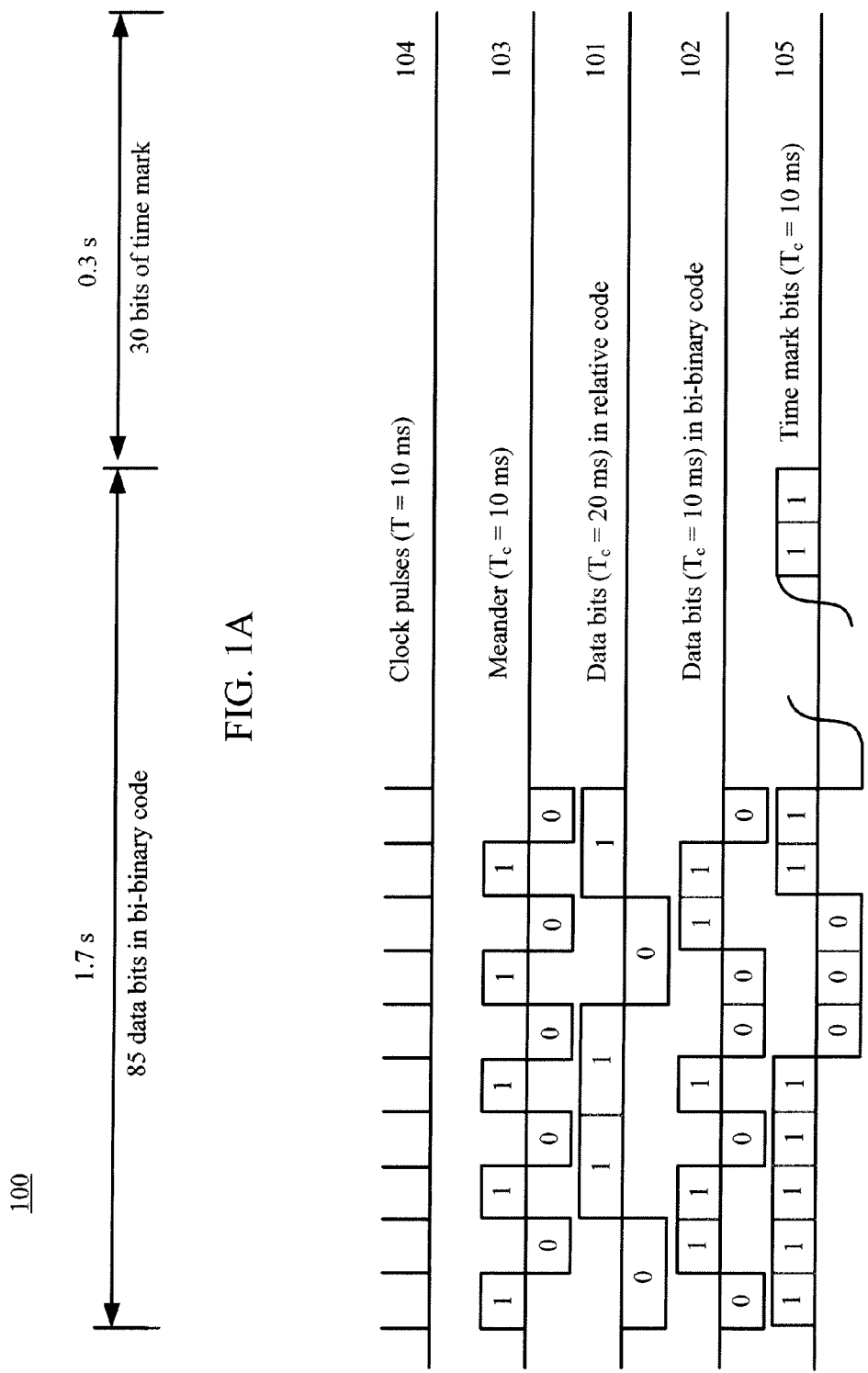
FIG. 1A illustrates a GLONASS string.
FIG. 1B shows the GLONASS data bits in both relative code before encoding and in bi-binary code after encoding.
Figure 2:
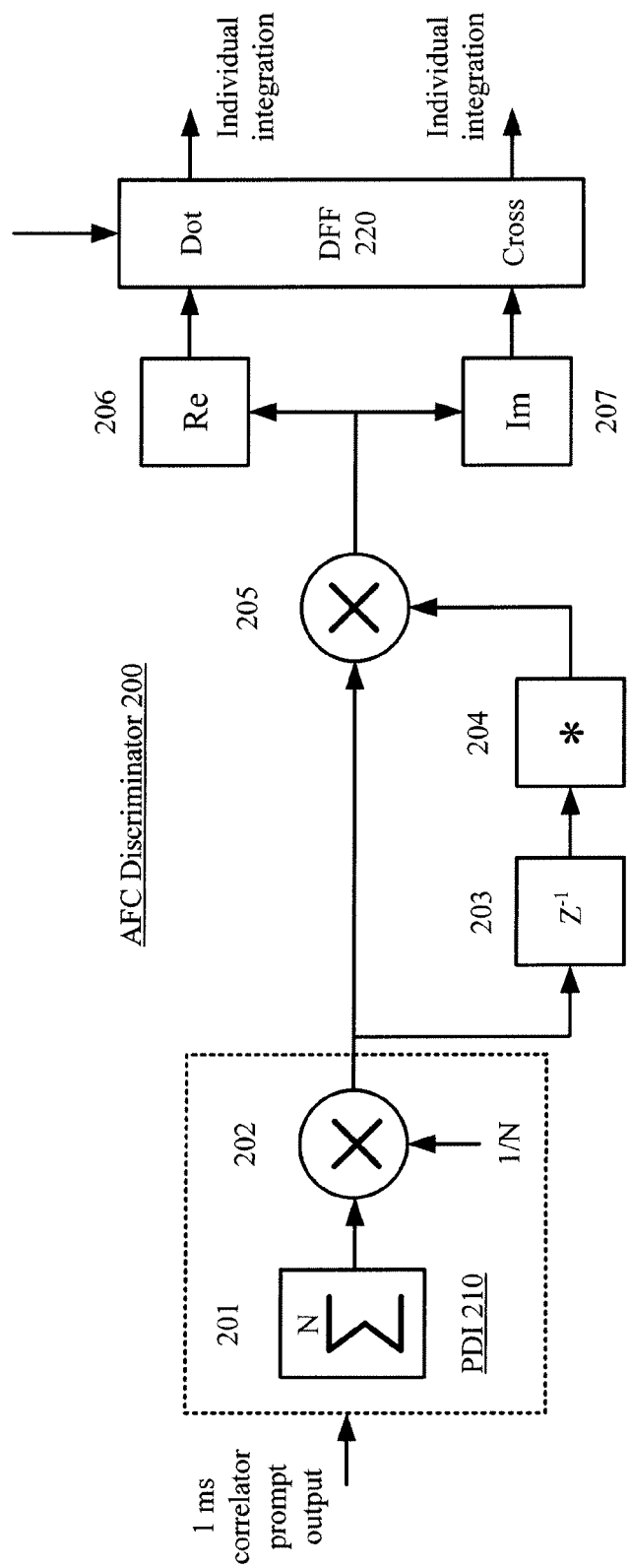
FIG. 2 illustrates an exemplary PDI block, which forms part of an AFC discriminator.

In accordance with one aspect of providing AFC for a GLONASS receiver, a pre-detection integration (PDI) period can be programmed. FIG. 2 illustrates an exemplary PDI block 210, which forms part of an AFC discriminator 200. The input of AFC discriminator 200 comes from the 1 ms correlator prompt output. The output of block 200 goes to the individual integration and then complete the AFC discriminator functionality such as a tan 2(ΣCross, ΣDot). In this embodiment, PDI block 210 includes an integrator 201 and a multiplier 202. Note that integrator 201 uses N samples, wherein N is an integer corresponding to the time (measured in ms) for integrating. Note further that multiplier 202 multiplies the output of integrator 201 by 1/N.

The output of multiplier 202 is provided to another multiplier 205, which further receives from the data path with one sample delay 203 and complex conjugation 204. The output of multiplier 205 is provided to both a real component generator 206 and an imaginary component generator 207. The outputs of generators 206 and 207 are called "Dot" and "Cross", respectively by industry convention. A decision-directed flip (DDF) signal 220 adjusts the polarity of the values of Dot and Cross as follows:

a. if (Dot < 0)
    b. {
        i. Dot = −Dot;
        ii. Cross = −Cross;
    c. }

The operation of an AFC loop in a GLONASS receiver can be analyzed based on four stages: before a 10 ms boundary in the GLONASS data is detected (stage I), after the 10 ms boundary and before a 20 ms boundary (stage II), after the 20 ms boundary and before the time mark detection (stage III), and after time mark detection (stage IV).

In the first stage, because bit boundary information is not yet available, a random PDI starting position is assumed. However, because of the random PDI starting position, a longer PDI has a higher probability of crossing the 10 ms data boundary more frequently. Frequent crossing of the 10 ms data boundary can result in SNR loss as well as erroneous discriminator output. Therefore, PDIs of 1-5 ms can minimize the probability of crossing the 10 ms data boundary based on a random PDI starting position. Note that there are two possible modes: (1) apply the DDF for the cross-dot pair or (2) use the cross-dot pair without DDF.

Figure 3:
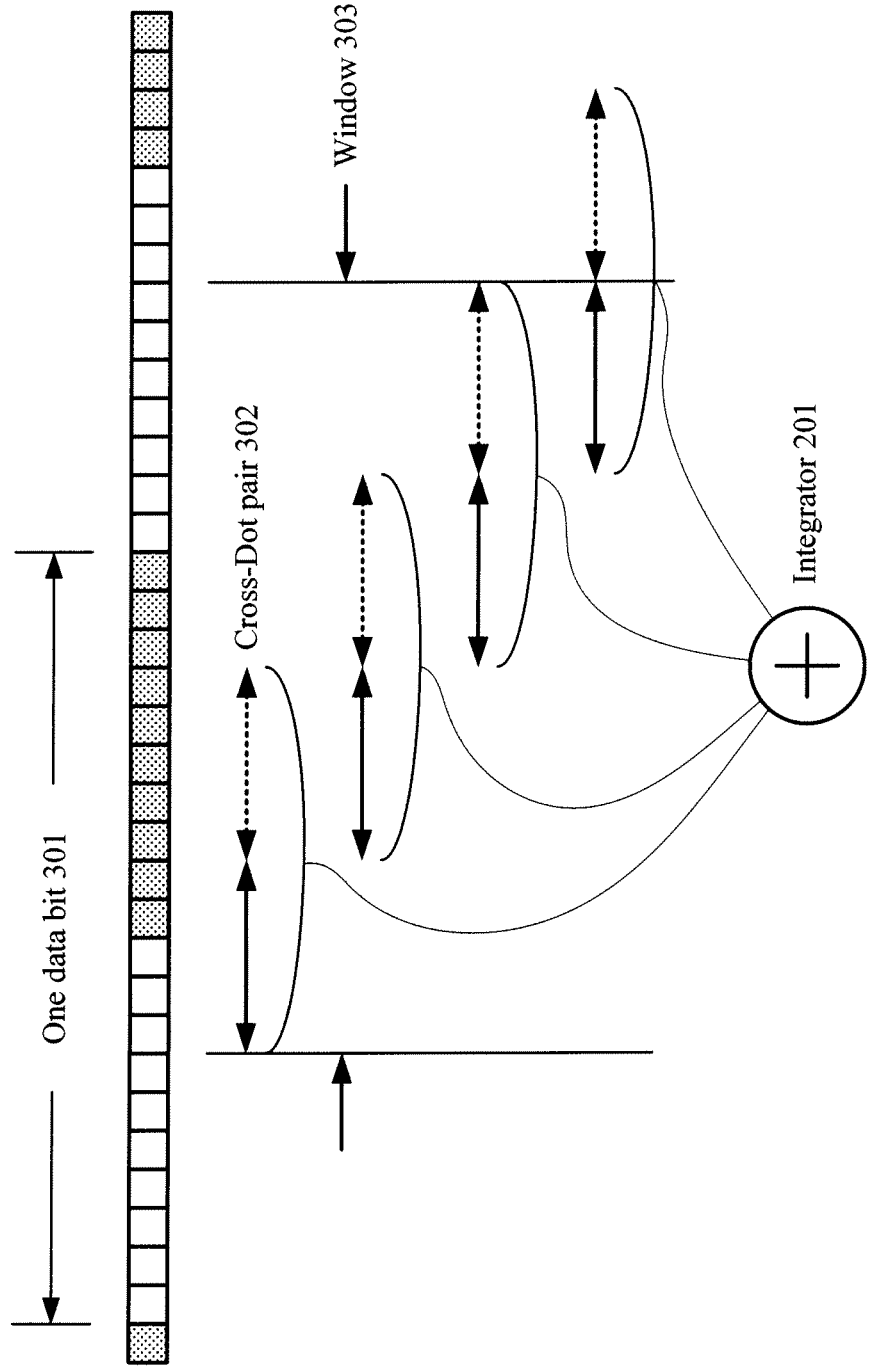

FIG. 3 illustrates an exemplary stage I analysis of data bits (one data bit 301 being labeled) (each square indicating 1 ms), with PDI=5 ms and DDF ON (wherein the two arrows, one solid and the other dotted, represent the cross and dot values) to each cross-dot pair 302 (one labeled for simplicity). In this embodiment, integrator 201 (shown as an adder in FIG. 3) can integrate cross-dot pairs 302 up to 20 ms, which is shown as a window 303, for discriminator computation.

Figure 4:
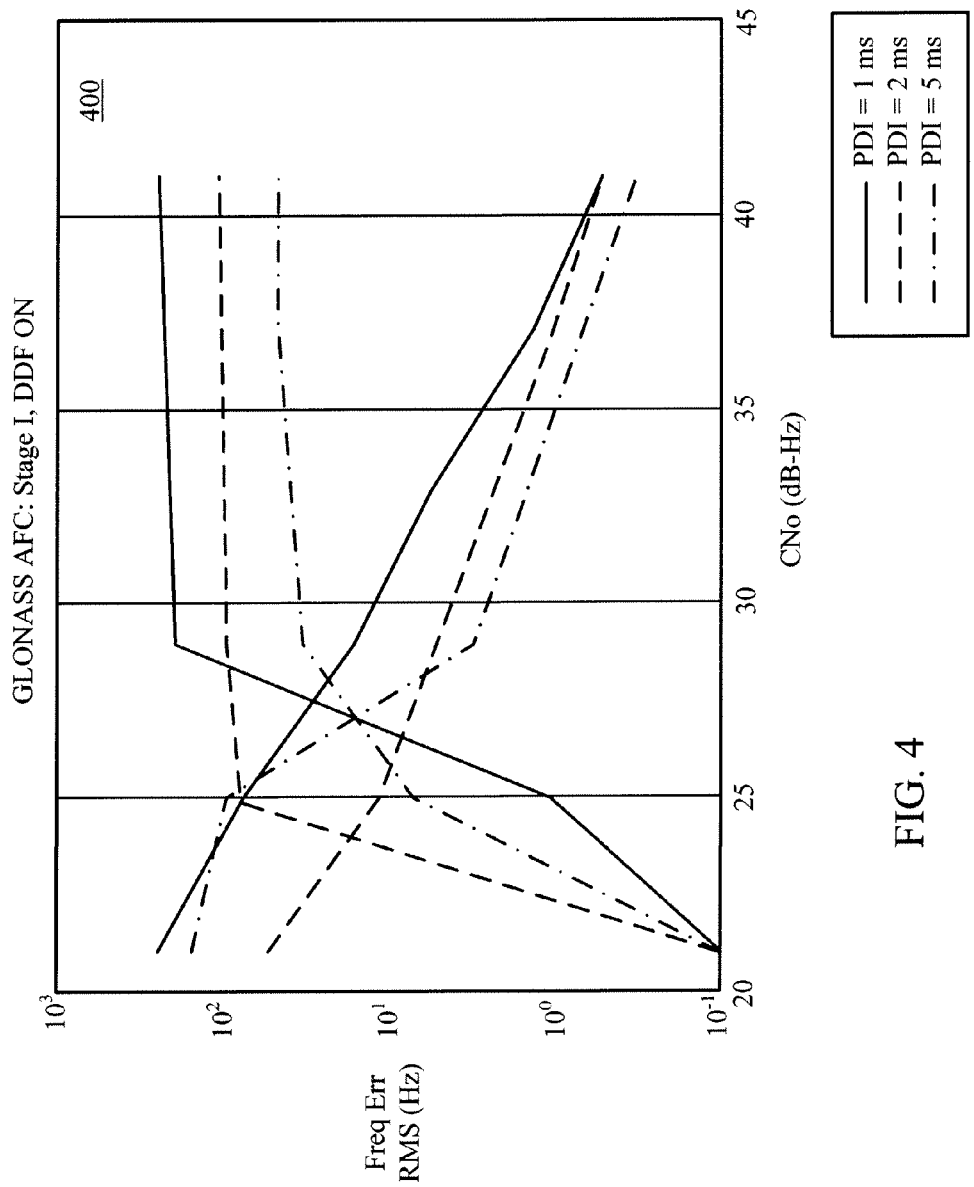
FIG. 4 illustrates a graph that shows the steady state tracking performance and the pull-in ability of the DDF ON mode for a GLONASS AFC in stage I.

FIG. 4 illustrates a graph 400 that shows the steady state tracking performance and the pull-in ability of the DDF ON mode for a GLONASS AFC in stage I. The black lines are the steady state tracking frequency error RMS, whereas the gray lines are the maximal pull-in frequency. As shown in the legend of FIG. 4, a PDI=1 ms is shown by a solid line, a PDI=2 ms is shown by a dashed line, and a PDI=5 ms is shown by a dashed-dot line. The operating region of each PDI is indicated by its corresponding two lines starting at their intersection, i.e. its lowest CNo (channel to noise, also called signal to noise herein) value and its maximal pull-in frequency. For example, the operating region of PDI=2 ms has a low CNo value of 24 and a maximal pull-in frequency of $10^2$.

Figure 5:
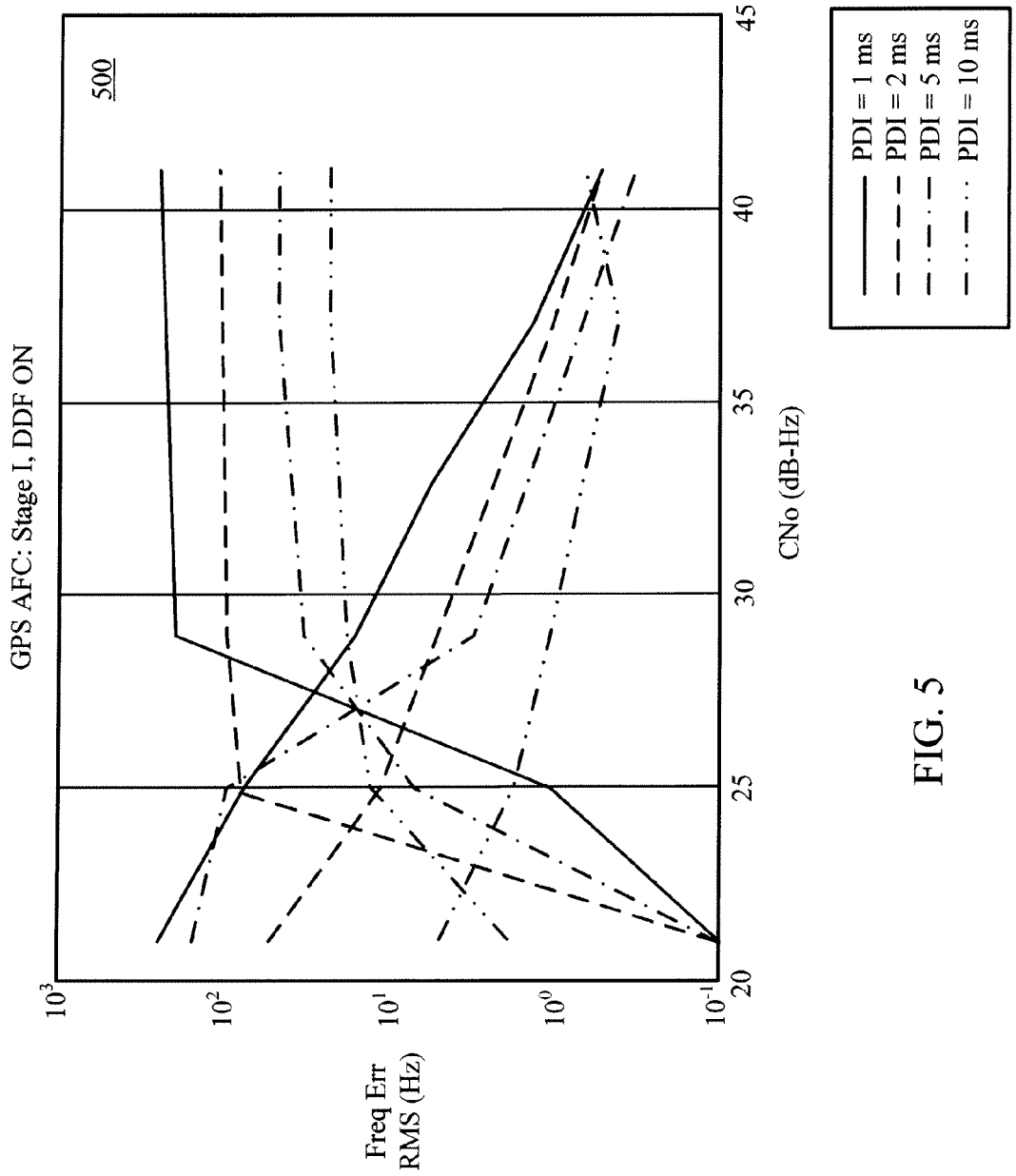
FIG. 5 illustrates a graph that shows the steady state tracking performance and the pull-in ability of the DDF ON mode for a GPS AFC in stage I.

FIG. 5 illustrates a graph 500 that shows the steady state tracking performance (black lines) and the pull-in ability (gray lines) of the DDF ON mode for a GPS AFC in stage I. As shown in the legend of FIG. 5, a PDI=1 ms is shown by a solid line, a PDI=2 ms is shown by a dashed line, a PDI=5 ms is shown by a dashed-dot line, and a PDI=10 ms is shown by a dashed-dot-dot line.

Referring to FIGS. 3 and 4, note that for PDI=1 ms, the GLONASS and GPS AFCs have similar tracking performance and pull-in ability. For PDI=2 ms, the pull-in ability of GLONASS and GPS AFCs is similar, while the GLONASS AFC tracking performance is larger than that of the GPS AFC at high SNR (i.e. CNo). For PDI=5 ms, the CNo for the GLONASS AFC is about 3 dB higher than that of the GPS AFC, and the tracking performance of the GLONASS AFC is about 4 dB worse than that of the GPS AFC.

Figure 6:
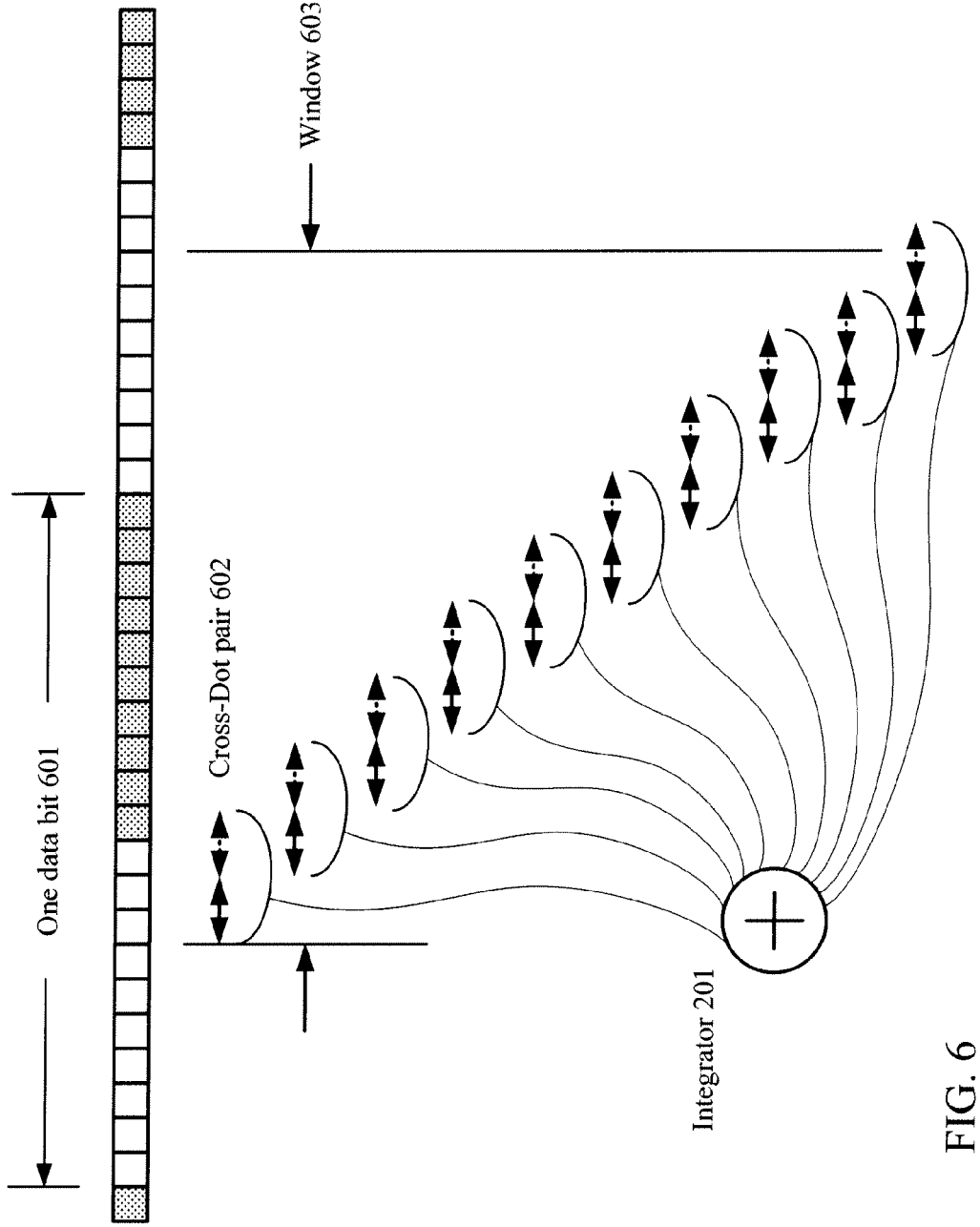
FIG. 6 illustrates an exemplary stage I analysis of data bits with PDI=2 ms and DDF OFF.

FIG. 6 illustrates an exemplary stage I analysis of data bits (one data bit 601 being labeled) (each square indicating 1 ms), with PDI=2 ms and DDF OFF to each cross-dot pair 602 (one labeled for simplicity). In this embodiment, integrator 201 can integrate cross-dot pairs 602 up to 20 ms, which is shown as a window 603, for discriminator computation.

Figure 7:
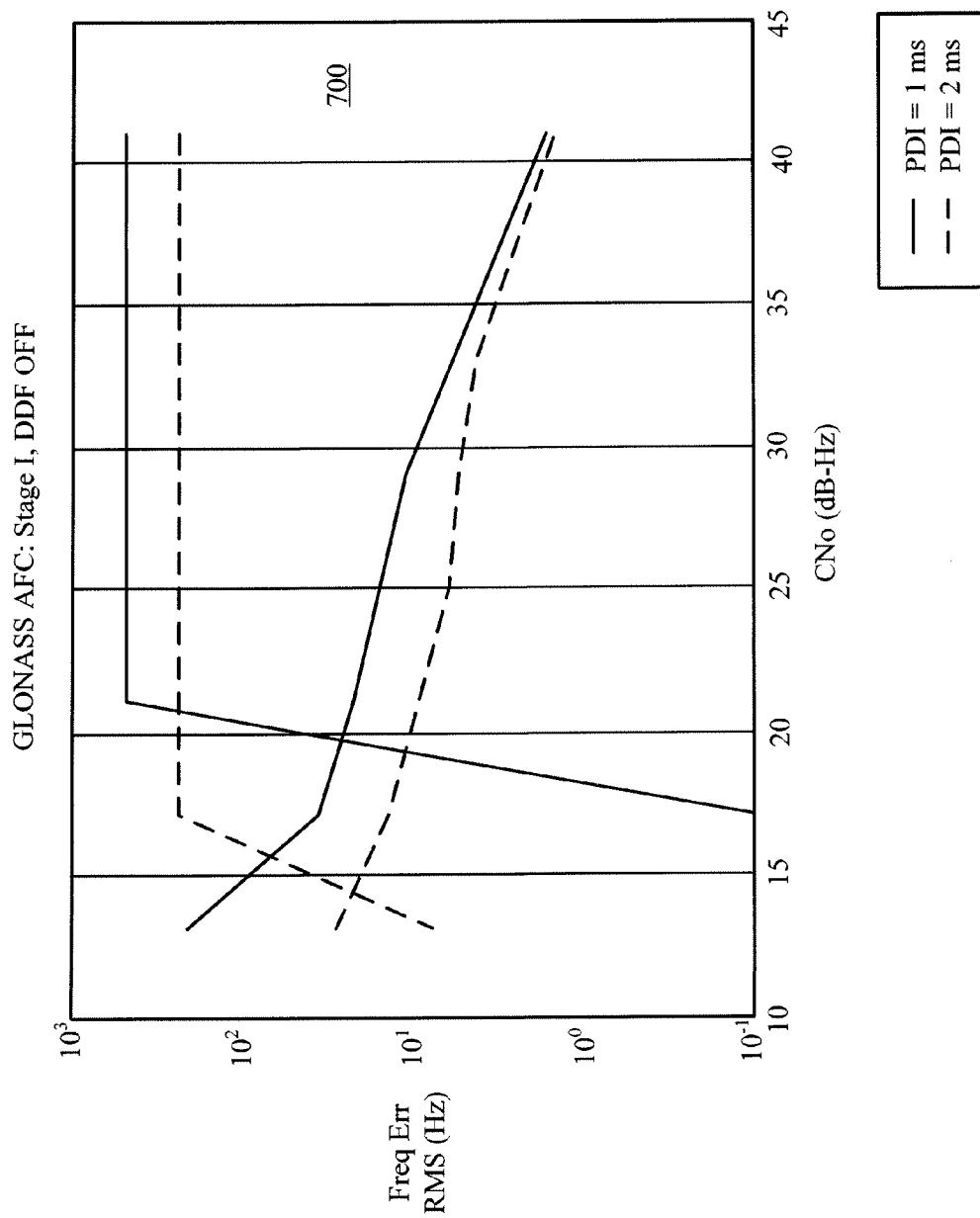
FIG. 7 illustrates a graph that shows the steady state tracking performance and the pull-in ability of the DDF OFF mode for a GLONASS AFC in stage I.

FIG. 7 illustrates a graph 700 that shows the steady state tracking performance and the pull-in ability of the DDF OFF mode for a GLONASS AFC in stage I. Note that the designation of lines in graph 700 follows the convention previously described in FIGS. 4 and 5 (and is used in subsequent graphs as well). Only PDI=1 ms and PDI=2 ms operate effectively in this mode. As shown by comparing FIGS. 7 and 4, the pull-in frequency of the DDF OFF mode is about twice of that of the DDF ON mode. However, the steady state tracking error is also increased. The required CNo is reduced to 20 dB-Hz for PDI=1 ms (vs. 27 dB-Hz for DDF ON mode) and 15 dB-Hz for PDI=2 ms (vs. 24 dB-Hz for DDF ON mode). Therefore, the DDF OFF mode is more suitable for lower CNo (SNR) and larger initial frequency error. In contrast, the DDF ON mode is more suitable for higher CNo and smaller initial frequency error, and leads to smaller steady state tracking error.

Figure 8:
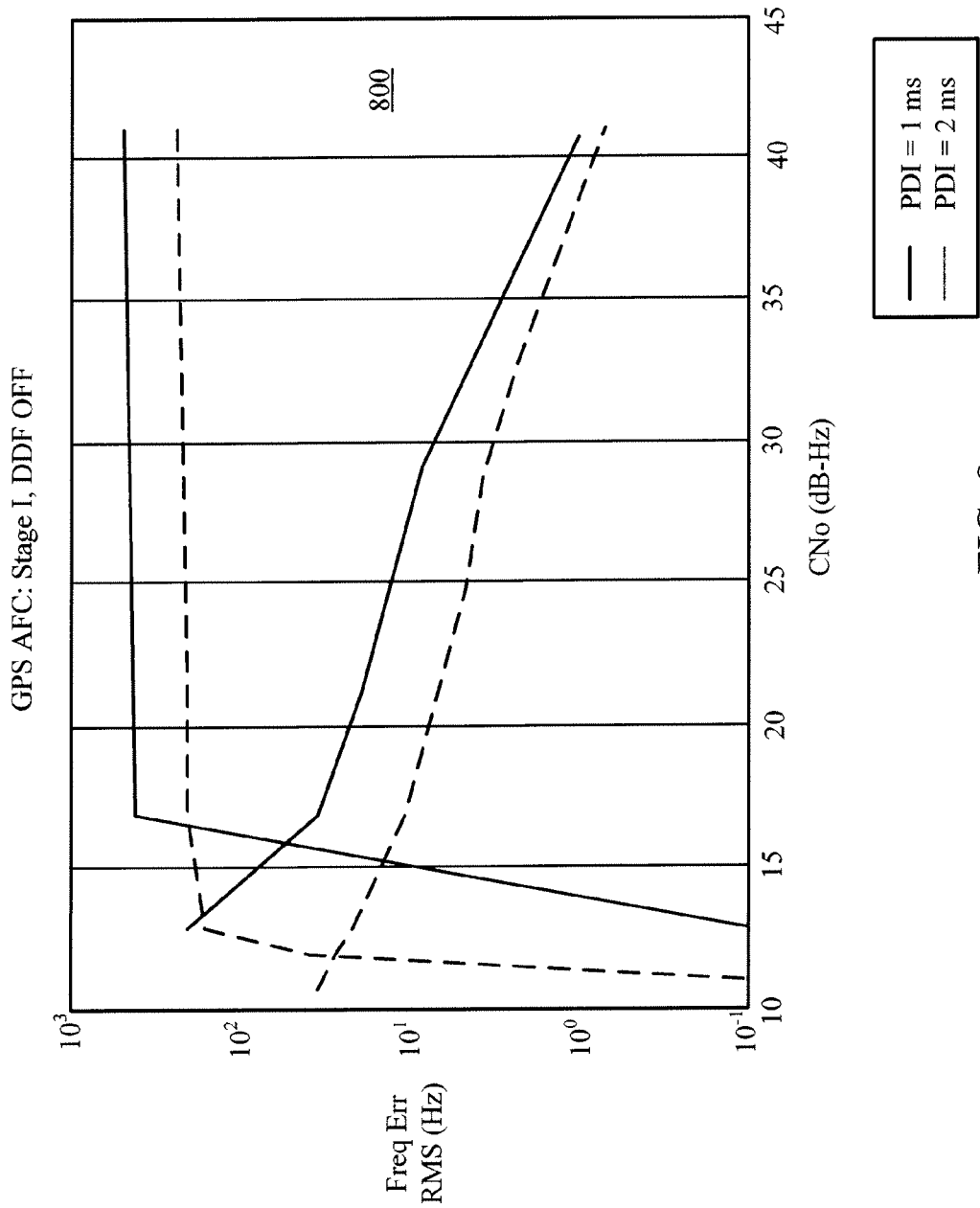
FIG. 8 illustrates a graph that shows the steady state tracking performance and the pull-in ability of the DDF OFF mode for a GPS AFC in stage I.

FIG. 8 illustrates a graph 800 that shows the steady state tracking performance and the pull-in ability of the DDF OFF mode for a GPS AFC in stage I. As shown by comparing FIGS. 7 and 8, for PDI=2 ms, the GLO pull-in range is 3 dB worse than GPS, and the GLO sensitivity is 4 dB worse than GPS at frequency RMS error 2 Hz. The performance gap with DDF OFF is similar to that with DDF ON (see FIGS. 5 and 8).

Figure 9:
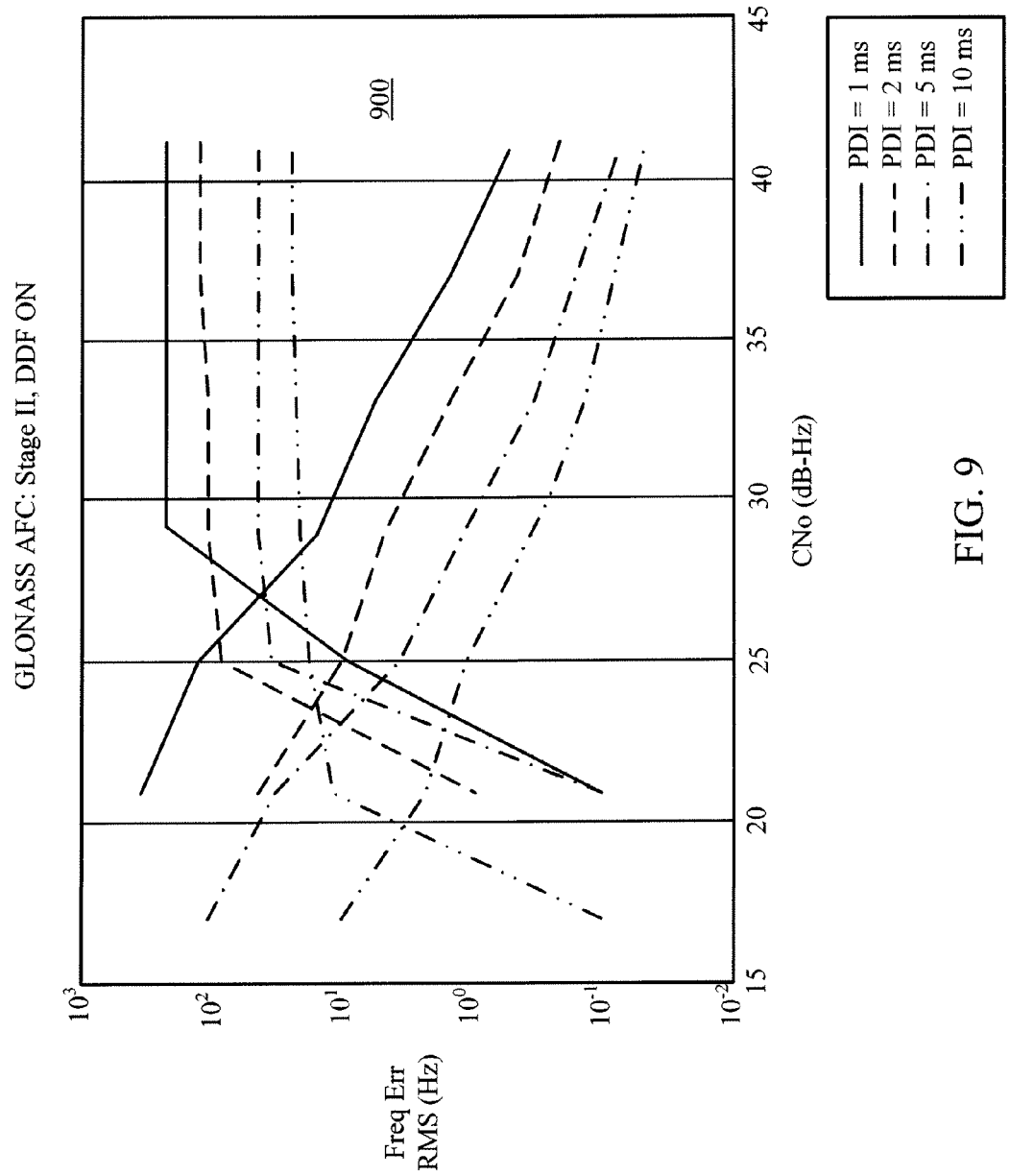
FIG. 9 illustrates a graph that shows the steady state tracking performance and the pull-in ability of the DDF ON mode for a GLONASS AFC in stage II.

Notably, after the 10 ms boundary is detected (stage II), the PDI can be aligned with the 10 ms boundary to improve the integration signal strength and thus tracking performance. Once again, two modes are possible, i.e. DDF ON and DDF OFF. For the DDF ON mode, the effective PDI length can go up to 10 ms. FIG. 9 illustrates a graph 900 that shows the steady state tracking performance and the pull-in ability of the DDF ON mode for a GLONASS AFC in stage II. As shown in FIG. 9, the PDI=10 ms has the best sensitivity (about 20 dB-Hz) and the smallest steady state tracking performance.

Figure 10:
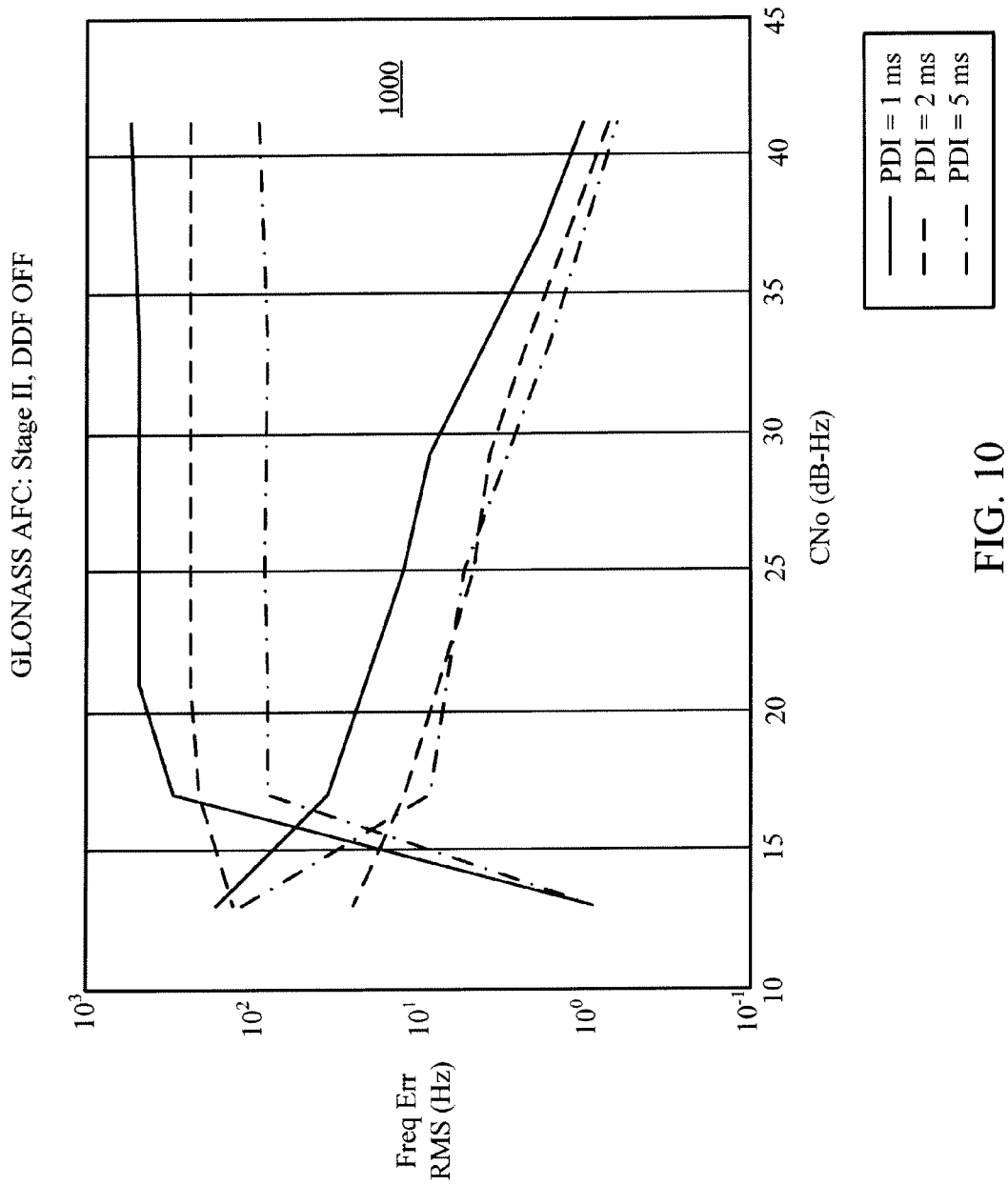
FIG. 10 illustrates a graph that shows the steady state tracking performance and the pull-in ability of the DDF OFF mode for a GLONASS AFC in stage II (three PDI settings shown).

In one embodiment, for the DDF OFF mode, the cross-dot pair crossing the 10 ms boundary is not used to avoid a possible impairment to the AFC loop. FIG. 10 illustrates a graph 1000 that shows the steady state tracking performance and the pull-in ability of the DDF OFF mode for a GLONASS AFC in stage II (three PDI settings shown). Compared to the DDF ON mode in FIG. 9, the DDF OFF mode has about twice pull-in frequency and has larger steady state tracking error at high and medium CNo. As the CNo further decreases, its tracking error becomes smaller than that of the DDF ON mode. The operation region extends below 17 dB-Hz. FIG. 10 shows that the DDF OFF mode is more suitable for low SNR in stage II.

In a GLONASS receiver, the 20 ms bit boundary may be detected before the time mark detection because time mark only occurs every 2 s. If 20 ms bit boundary is detected but time mark is not (stage III), then the 10 ms PDI can be used, but there may be some problems during the unknown time mark period, which is shown below.

Figure 11:
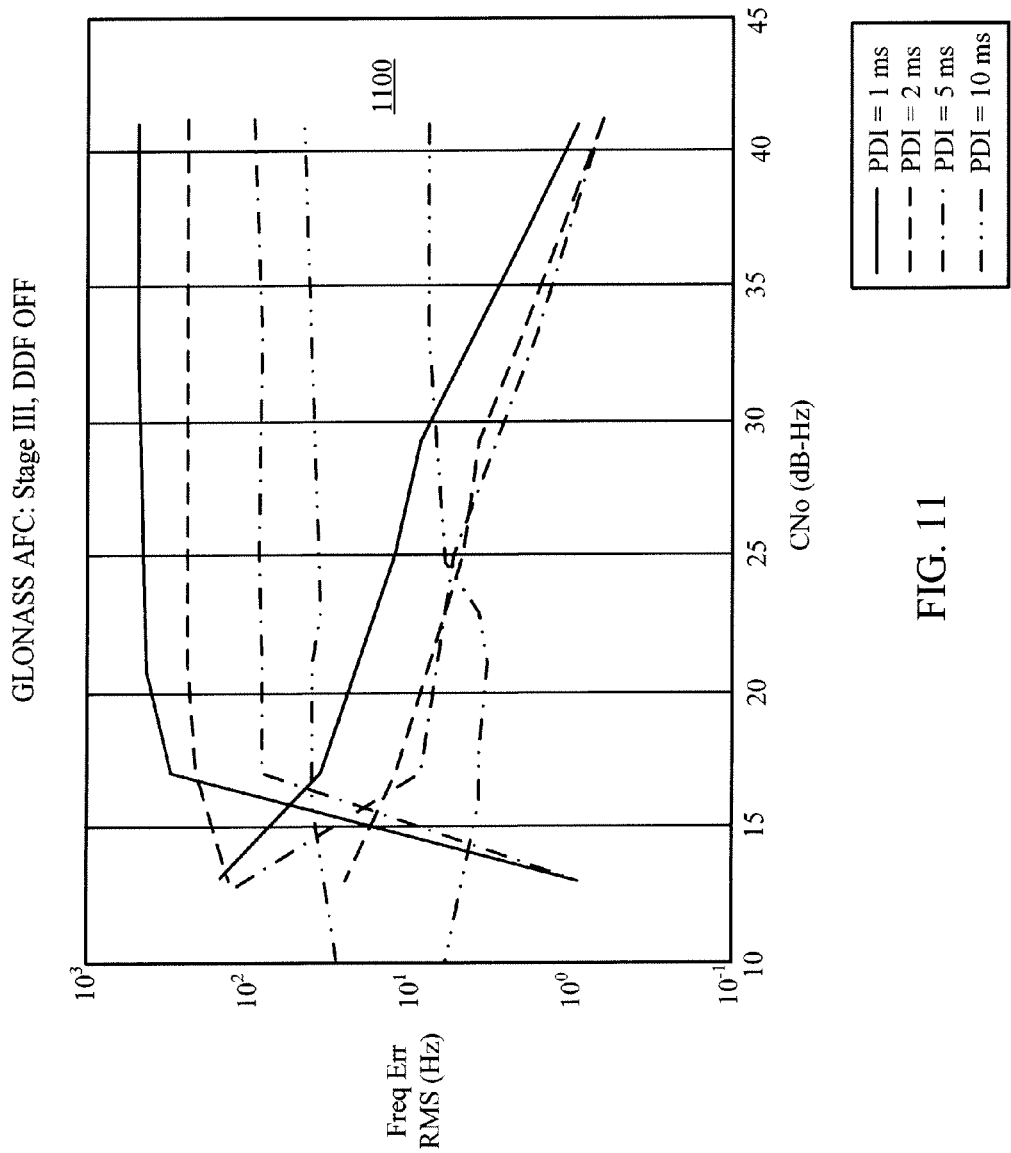
FIG. 11 illustrates a graph that shows the steady state tracking performance and the pull-in ability of the DDF OFF mode for a GLONASS AFC in stage III.

For the DDF ON mode in stage II, the PDI has already been able to advance to 10 ms. Thus, one possible change in stage III is to turn off the DDF. FIG. 11 illustrates a graph 1100 that shows the steady state tracking performance and the pull-in ability of the DDF OFF mode for a GLONASS AFC in stage III. As shown by comparing FIGS. 9 and 11, turning off the DDF can increase the AFC frequency tracking error and the time mark being at an unknown location can further compound this error. The increased frequency error can adversely affect the time mark detection. Therefore, in one embodiment, the AFC can remain in the DDF ON mode and wait for the time mark detection to complete.

For the DDF OFF mode in stage II, the PDI is equal to 5 ms with the 10 ms boundary crossing cross-dot pairs skipped for discriminator computation. After 20 ms boundary is detected, i.e. stage III, an advance to PDI=10 ms can be attempted. FIG. 11 shows that the AFC tracking performance can be improved by advancing to PDI=10 ms when signal strength is below the design point (in FIG. 11, below 25 dB). This AFC tracking performance can improve the time mark detection for weak signals.

Figure 12:
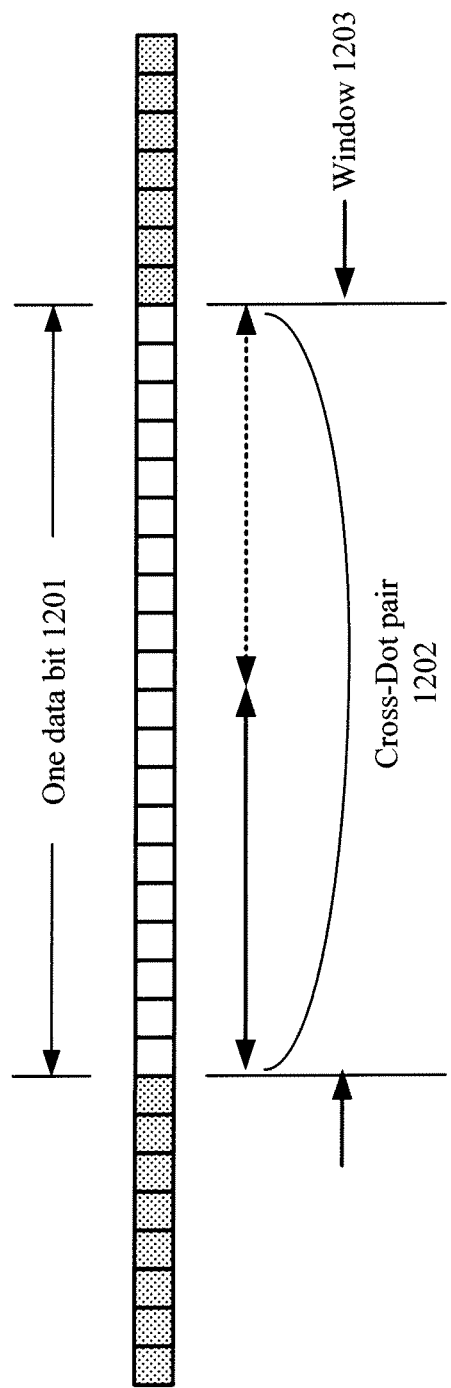
FIG. 12 illustrates an exemplary stage IV analysis of data bits, with cross-dot pairs being integrated up to 20 ms for discriminator computation and PDI=10 ms.

After the time mark sequence is detected (stage IV), the meander sequence in the data sequence can be removed and the time mark data can be wiped off. At this point, the GLONASS AFC enters its stable tracking state. FIG. 12 illustrates an exemplary stage IV analysis of data bits (one data bit 1201 being labeled) (each square indicating 1 ms), with cross-dot pairs (e.g. cross-dot pair 1202) being integrated up to 20 ms for discriminator computation and PDI=10 ms. Note that in stage IV, the PDI starts from the 20 ms boundary of the data bit.

Notably, in stage IV, except the clean time mark period, the signal stream of the GLONASS has the same format as that of the GPS from the perspective of the AFC loop. Therefore, the method used for the GPS AFC can be used for the GLONASS AFC. In a first method, the 20 ms boundary-crossing cross-dot pair can be skipped without DDF. In a second method, the 20 ms boundary-crossing cross-dot pair can be included in calculating the discriminator output, and a PDI=20 ms can be used during the time-marker period.

Figure 13:
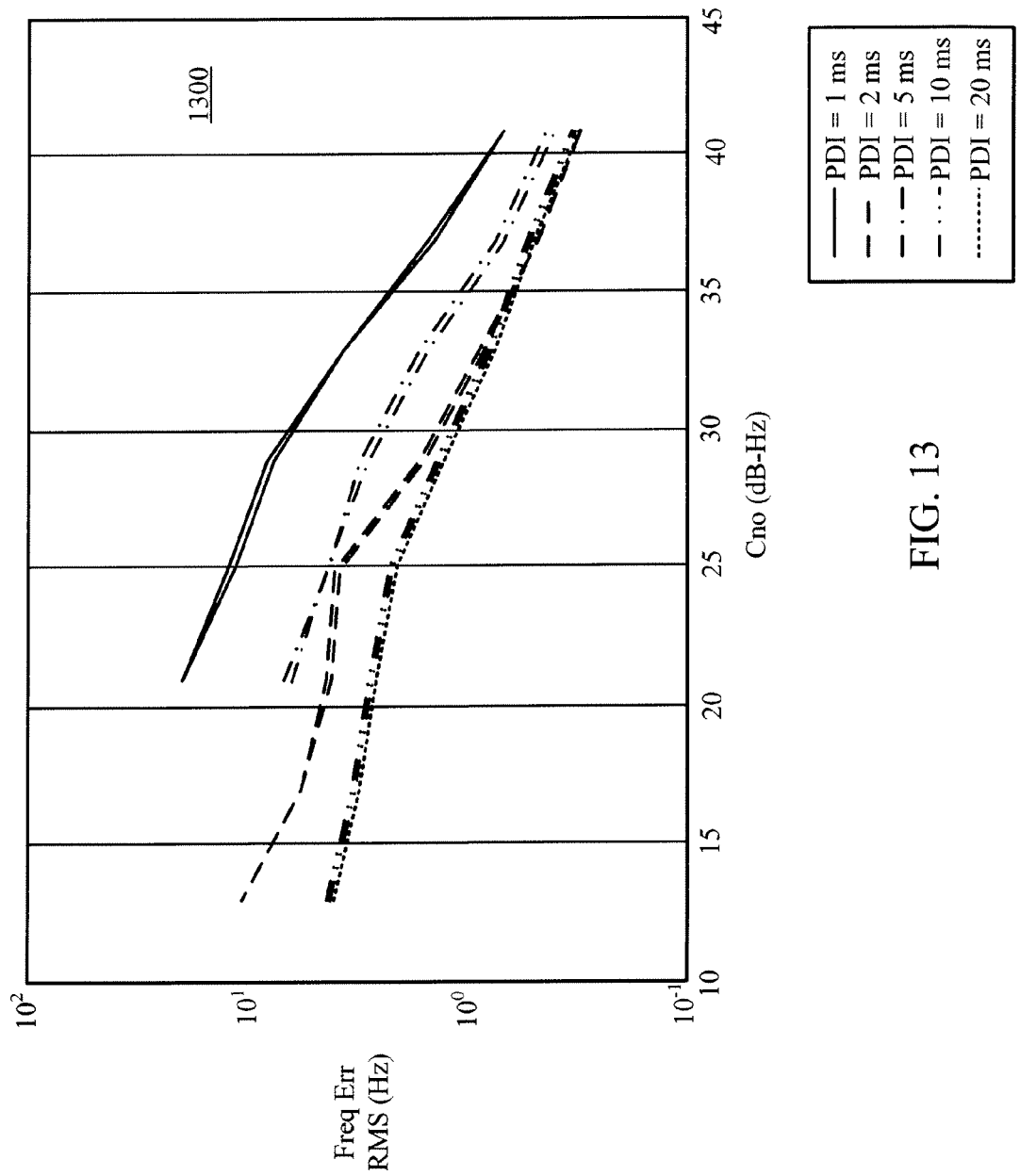
FIG. 13 illustrates a graph showing the steady tracking error performance of stage IV.

FIG. 13 illustrates a graph 1300 showing the steady tracking error performance of stage IV. The black lines indicate the first method and the gray lines indicate the second method. Note that the steady tracking performance of GLONASS (first method) should be same as that of GPS if the implementation loss of the two systems is the same. By taking into account the clean time mark sequence, the second method can have a slightly better performance (e.g. about 0.6 dB better) than the first method.

Table 1 below summarizes performance of a GLONASS AFC with possible DDF and PDI combinations.

TABLE 1

GLONASS AFC Performance Summary

| Stage, DDF, PDI | Pull-in signal range | Pull-in frequency @ 40 dB-Hz | RMS freq err @ 40 dB-Hz |
|---|---|---|---|
| I, ON, 2 ms | 24 dB-Hz | 110 Hz | 0.5 Hz |
| I, ON, 5 ms | 27 dB-Hz | 45 Hz | 0.3 Hz |
| I, OFF, 2 ms | 14 dB-Hz | 220 Hz | 1.5 Hz |
| II, ON, 5 ms | 24 dB-Hz | 45 Hz | 0.09 Hz |
| II, ON, 10 ms | 20 dB-Hz | 23 Hz | 0.06 Hz |
| II, OFF, 5 ms | 16 dB-Hz | 90 Hz | 0.7 Hz |
| III, OFF, 10 ms | <10 dB-Hz | 40 Hz | 3.2 Hz |
| IV, OFF, 10 ms | <10 dB-Hz | 45 Hz | 0.2 Hz |

As discussed above, the GLONASS AFC pull-in procedure can have four stages. Note that to successfully transition from one stage to the next, the residual frequency error of the previous stage should be less than the pull-in frequency of the next stage. To ensure this condition, a frequency error detector can be provided to make the transition decision. A good frequency error detector can minimize time in the previous stage, ensure a fast transition from the previous stage to the next stage, and optimize the pull-in of the next stage.

In one embodiment of a GPS GML, the transition decision can be implemented by using frequency error estimation at the frequency discriminator output. This transition test can be determined as follows:

$$\text{afc.freqMS} = \text{afc.freqMS} + (\text{freq\_error}^2 - \text{afc.freqMS})32 \quad (\text{Eq. 1})$$

wherein freq_error is the discriminator output normalized in units of Hz (using the a tan 2(ΣCross, ΣDot) discriminator as an example, freq_error would be a tan 2(ΣCross, ΣDot)/(2π×PDI×0.001)), and afc.freqMS is the AFC frequency (mean square) initialized by the possible maximal frequency error such as the apriority maximal ACQ frequency error. The afc.freqMS is updated with the new freq_error every 20 ms during loop tracking.

Figure 14:
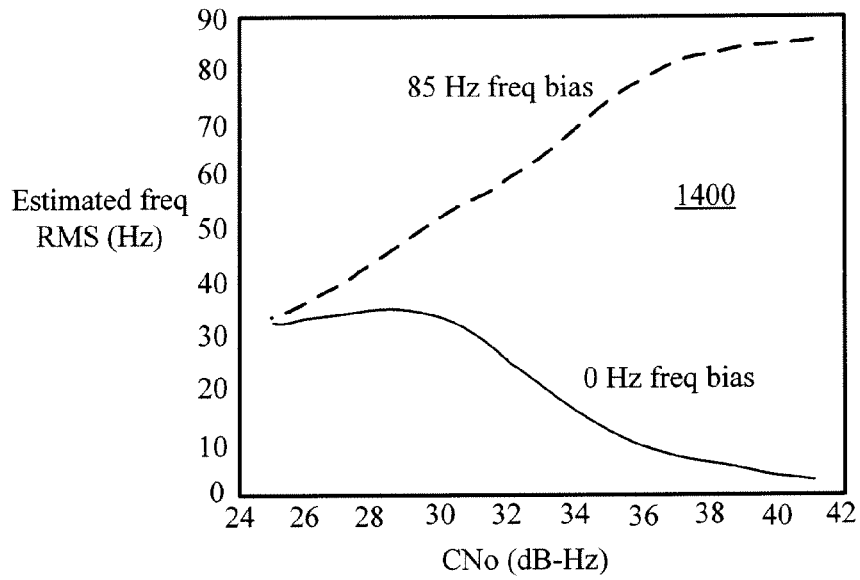
FIG. 14 illustrates a graph that indicates an estimated frequency error with the above-described GML computation for 0 Hz and 85 Hz offsets with a PDI=1 ms.
Figure 15:
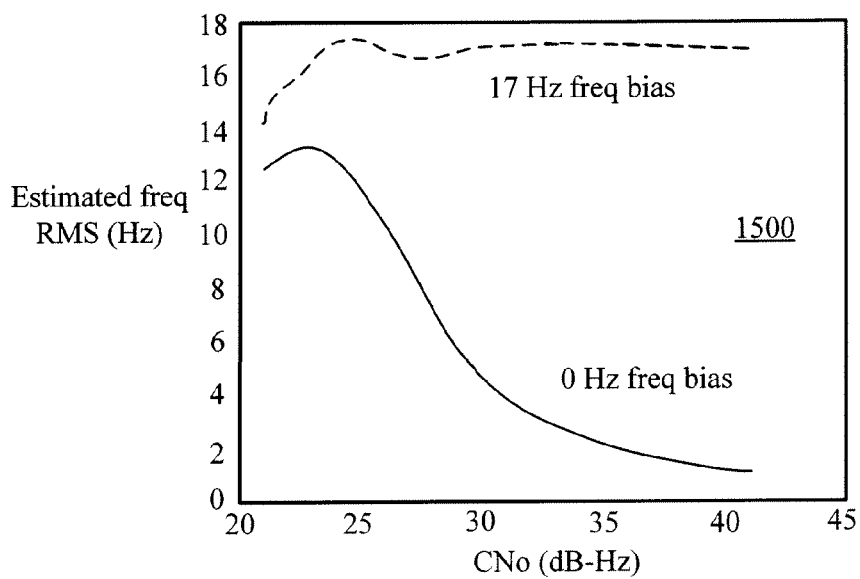
FIG. 15 illustrates a graph that indicates an estimated frequency error with the above-described GML computation for 0 Hz and 85 Hz offsets with a PDI=5 ms.

This transition test can also be used in the GLONASS GML. FIG. 14 illustrates a graph 1400 that indicates an estimated frequency error with the above-described GML computation for 0 Hz offset (solid line) and 85 Hz offset (dashed line) with a PDI=1 ms. FIG. 15 shows a graph 1500 that indicates an estimated frequency error with the above-described GML computation for 0 Hz offset (solid line) and 85 Hz offset (dashed line) with a PDI=5 ms. As shown by FIGS. 14 and 15, this GML computation works is effective when the signal strength is relatively high. However, when the signal becomes weak, the frequency error estimate using the discriminator output is biased significantly towards zero. This biasing can result in a false transition decision, thereby causing the next stage to fail to pull-in.

Figure 16:
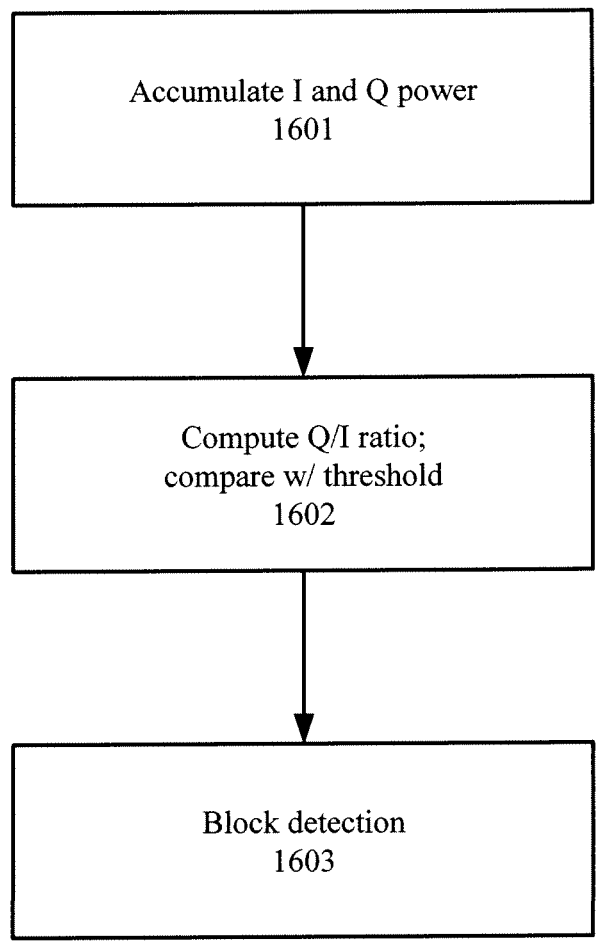
FIG. 16 illustrates a frequency error estimation technique that works for weak signals.

Therefore, another frequency error estimation technique that works for weak signals can be provided, as described in FIG. 16. In step 1601, the 20 ms Cross and Dot values of the frequency discriminator (which correspond to I and Q values) can be exponentially averaged using the following computations.

$$\text{afc.crossSum} = \text{afc.crossSum} + (\text{afc.discr\_sum} - \text{afc.crossSum})/32$$

$$\text{afc.dotSum} = \text{afc.dotSum} + (\text{afc.discr\_dot\_sum} - \text{afc.dotSum})/32$$

where afc.discr_sum is ΣCross and afc.discr_dot_sum is ΣDot (described in reference to FIG. 2).

In step 1602, the ratio of the averaged Cross and Dot values can be compared with a frequency-offset related threshold to determine whether the current frequency error falls in the acceptable region of the next stage. In one embodiment, the threshold can be mapped to frequency as a tan(threshold)/(2*π*PDI*0.001). When the ratio is less than the threshold, the accumulated I and Q values are "locked" and ready for transition to the next step (LCKDTR), as indicated below.

$$\text{LCKDTR} = (\text{abs}(\text{afc.crossSum})/(\text{afc.dotSum}) < \text{threshold}) \quad (\text{Eq. 2})$$

The frequency lock detection of step 1602 can be evaluated every 20 ms.

In step 1603, a transition decision can be made after 30 consecutive lock detections (30 out of 30, which would take 600 ms). These consecutive lock detections are also called block detection. This enhanced lock detector is expressed as $$\text{Enh\_LCKDTR} = (\text{sum}(\text{LCKDTR}(\text{end}-29\text{:end})) == 30) \quad (\text{Eq. 3})$$

Figure 17:
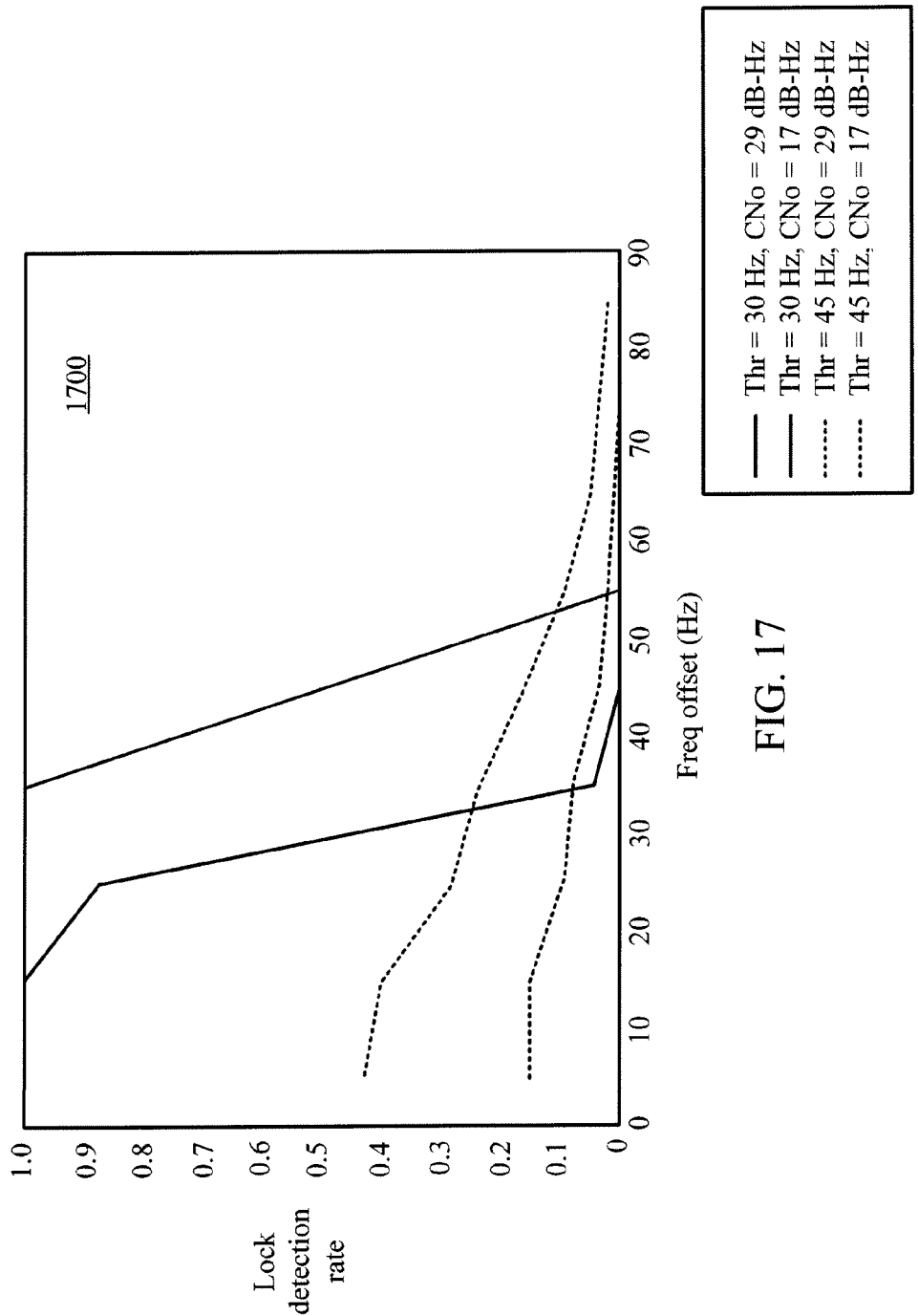
FIGS. 17 and 18 show the performance of a lock detector using the technique of FIG. 16.
Figure 18:
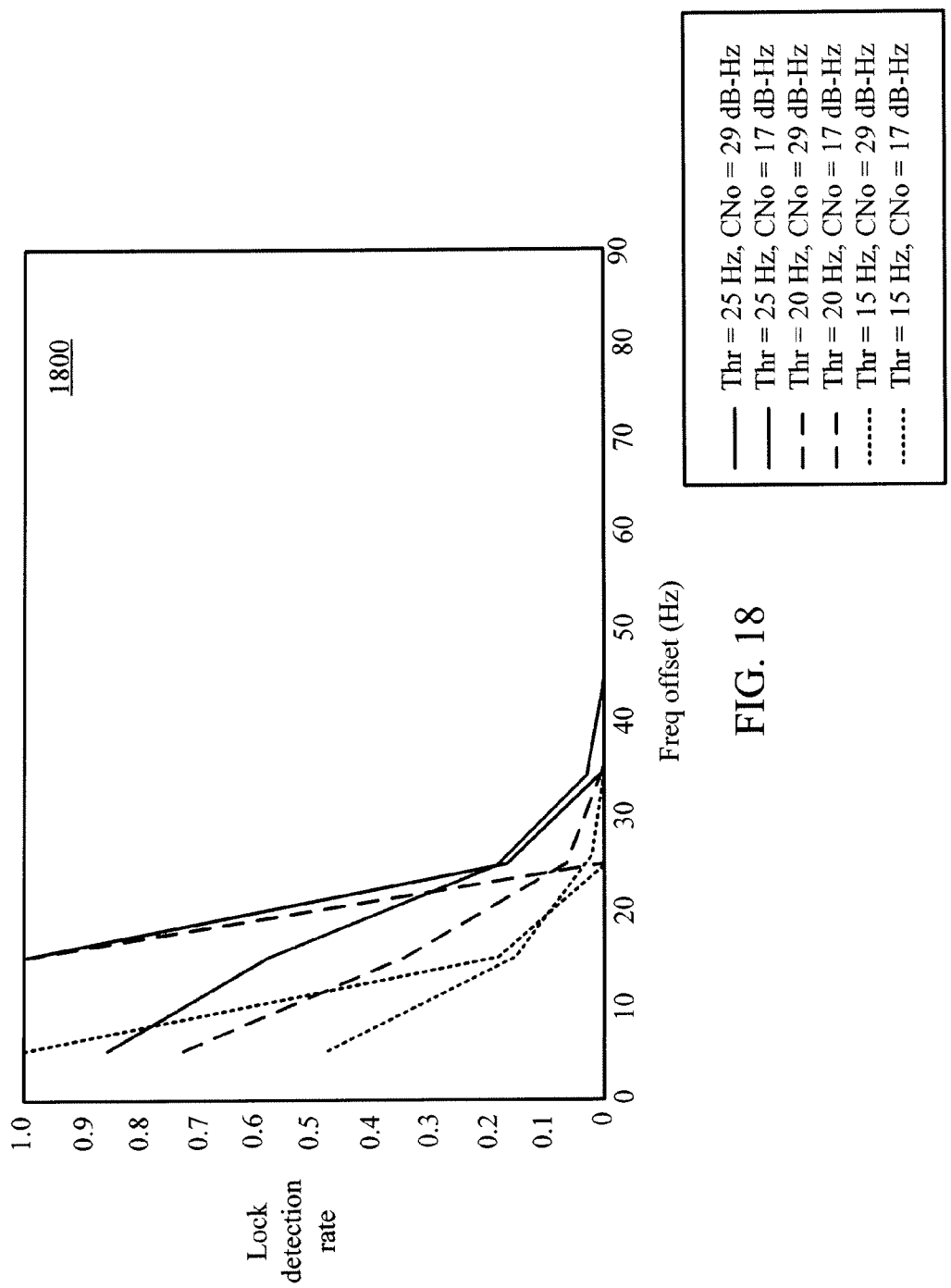

FIGS. 17 and 18 show the performance of a lock detector using the technique of FIG. 16. Specifically, FIG. 17 illustrates a graph 1700 indicating the lock detection rate as a function of frequency offset in stage I, whereas FIG. 18 illustrates a graph 1800 indicating the lock detection rate as a function of frequency offset in stage II. As shown by FIGS. 17 and 18, the lock detector works up to 29 dB-Hz. Note that the lock detection rate is lower than 100% (1.0 in FIGS. 17 and 18) for small frequency error at 17 dB-Hz. Note further that longer PDI (see FIG. 18, in stage II) gives relatively better performance than shorter PDI (see FIG. 17, in stage I).

Figure 19:
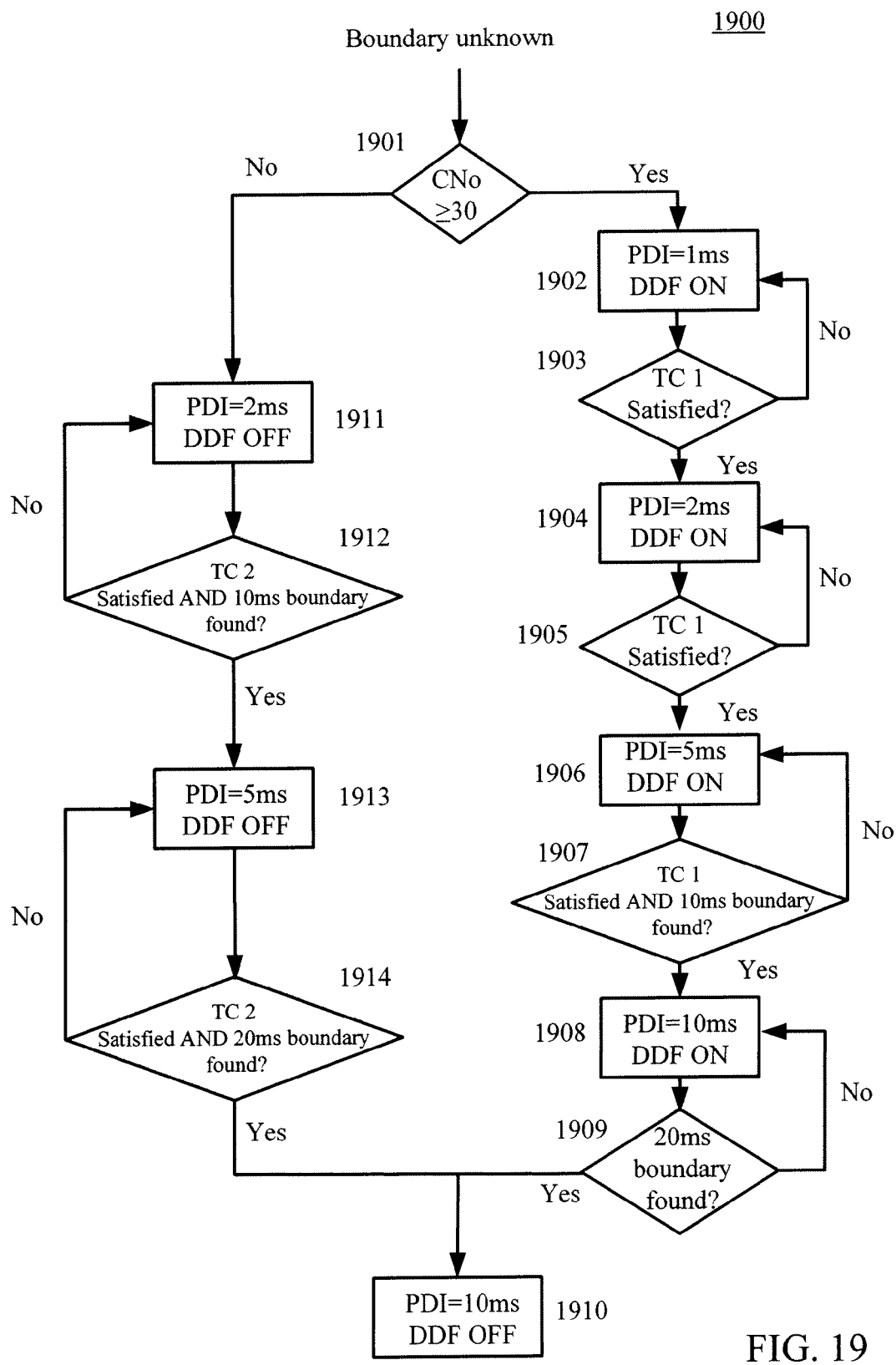

FIG. 19 illustrates an exemplary a two-mode, four-stage technique 1900 for a GLONASS AFC pull-in. Technique 1900 is based on Table 1 and the frequency error detection technique described in reference to FIG. 16. In technique 1900, step 1901 determines whether the received bits have a CNo greater than or equal to 30 dB-Hz, thereby indicating a strong signal. If so, then step 1902 uses a PDI=1 ms and turns DDF ON. Then, step 1903 determines whether a first test condition (TC1) is satisfied, wherein the first test condition includes a bad dot count test, which counts the number of 'dot<0' events, and the above described frequency error estimation (Eq. 1). If not, then technique 1900 continues to use PDI=1 ms and DDF ON. If so, then step 1904 uses PDI=2 ms with DDF ON.

Step 1905 then determines whether the first test condition is satisfied. If not, then technique 1900 continues to use PDI=2 ms and DDF ON. If so, then step 1906 uses PDI=5 ms with DDF ON.

Step 1907 then determines whether the first test condition is satisfied and whether the 10 ms boundary has been found. If one or both conditions are not satisfied, then technique 1900 continues to use PDI=5 ms and DDF ON. If both conditions are satisfied, then step 1908 uses PDI=10 ms with DDF ON.

Step 1909 then determines whether the 20 ms boundary has been found. If not, then technique 1900 continues to use PDI=10 ms and DDF ON. If so, then step 1910 uses PDI=10 ms, but turns off DDF (DDF OFF).

Referring back to step 1901, when the received bits have a CNo less than 30 dB-Hz, thereby indicating a weak signal, then step 1911 uses a PDI=2 ms and turns off DDF (DDF OFF). Step 1912 then determines whether the second test condition (TC 2) is satisfied and whether the 20 ms boundary has been found. In one embodiment, the second test condition is the above-described frequency lock technique (Eq. 2, FIG. 16). If one or both conditions are not satisfied, then technique 1900 continues to use PDI=2 ms and DDF OFF. If both conditions are satisfied, then step 1913 uses PDI=5 ms with DDF OFF.

Step 1914 then determines whether the second test condition is satisfied and whether the 20 ms boundary has been found. If one or both conditions are not satisfied, then technique 1900 continues to use PDI=5 ms and DDF OFF. If both conditions are satisfied, then step 1910 uses PDI=10 ms with DDF OFF.

Thus, for steps 1902-1909, a frequency error detector using the discriminator output can be used for the stage transition decision. In contrast, for steps 1911-1914, a frequency lock based detector can be used for the stage transition decision. Note that DDF ON is used for steps 1902-1909, whereas DDF OFF is used for steps 1911-1914. Notably, technique 1900 can also be implemented in a GPS GML.

Figure 20:
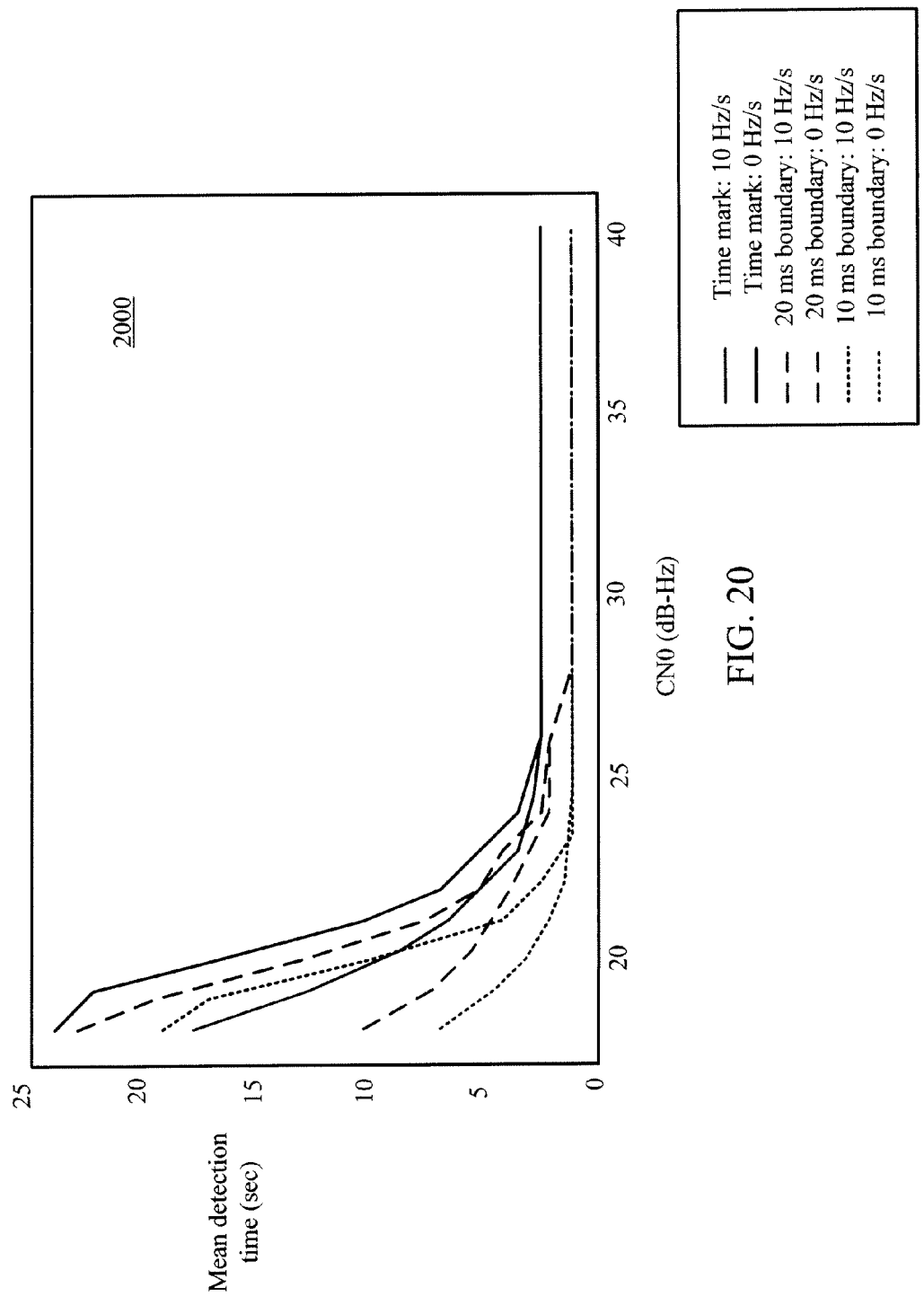
FIG. 20 illustrates a graph showing the mean detection time of 10 ms bit boundary, 20 ms bit boundary, and time mark detection as a function of CNo.

The above-described GLONASS AFC pull-in procedure has wide pull-in range and continues to work down to 17 dB-Hz when the 10 ms bit boundary and the time mark boundary information is available. For example, FIG. 20 illustrates a graph 2000 showing the mean detection time of 10 ms bit boundary, 20 ms bit boundary, and time mark detection as a function of CNo. As shown in FIG. 20, 20 ms bit boundary detection is faster than time mark detection. For a weak signal, acceleration appears to have a significant effect on the 10 ms boundary detection time and consequently affects the time of the other detections.

Figure 21:
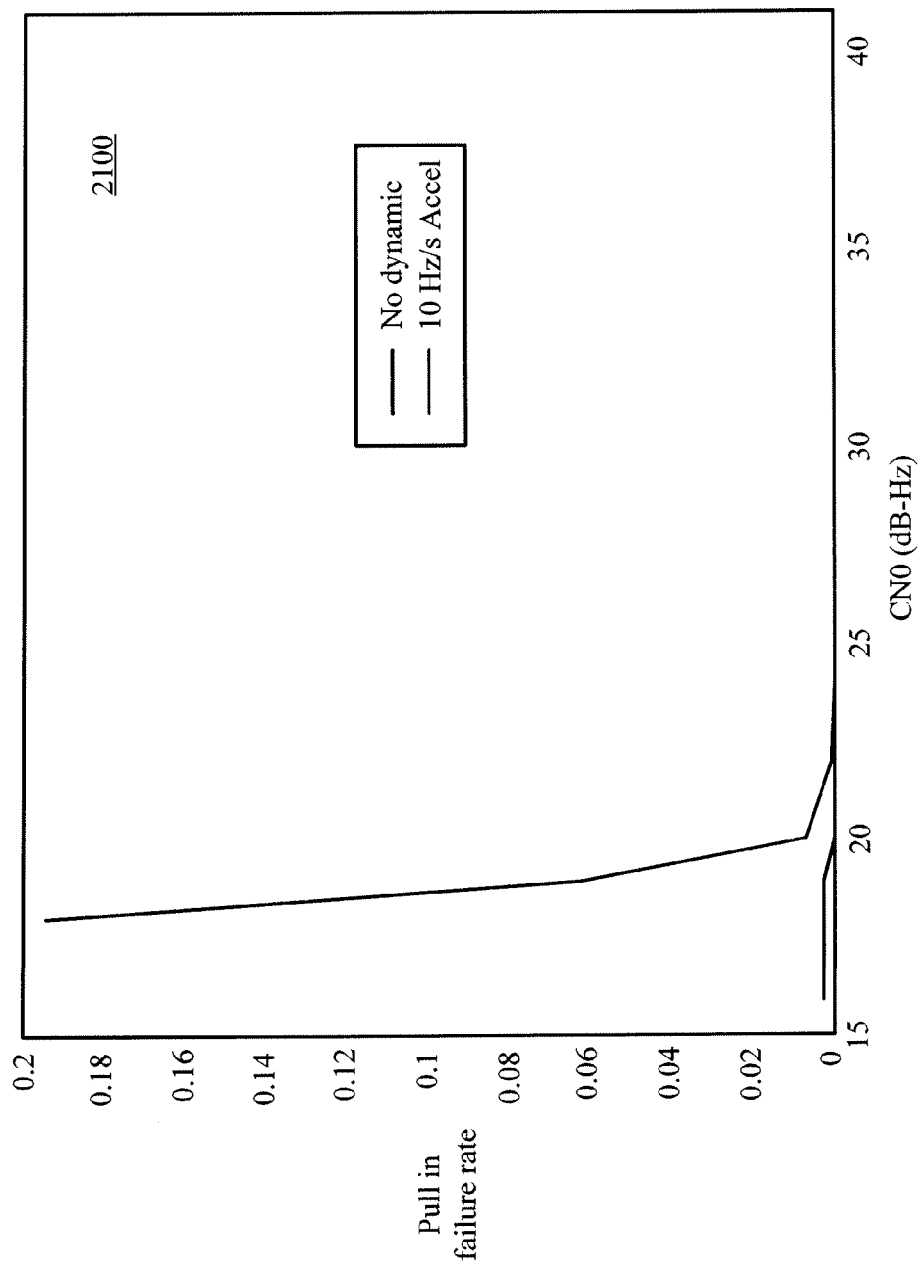
FIG. 21 illustrates a graph 2100 showing the pull-in failure rates as a function of CNo.

FIG. 21 illustrates a graph 2100 showing the pull-in failure rates as a function of CNo, wherein the pull-in failure can be defined as frequency error at timeout being larger than 50 Hz. Note that a CNo is approximately 20 dB-Hz for 1% pull-in failure with 10 Hz/s acceleration and less than 16 dB-Hz without acceleration.

Figure 22:
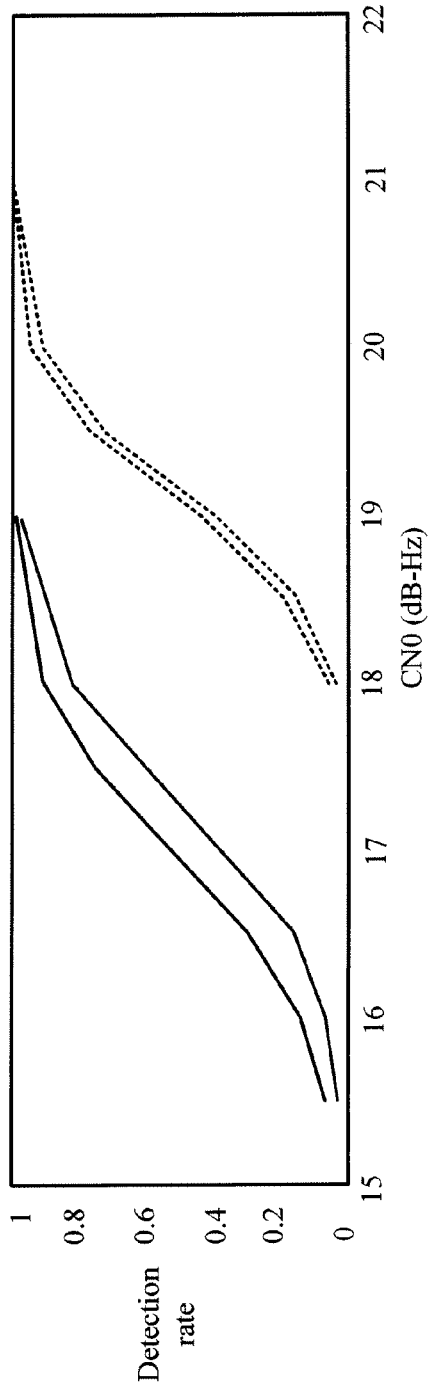
FIGS. 22 and 23 illustrate the time mark detection rate and false alarm rate results, respectively, of a specific PDI and CNo embodiment in stage III.
Figure 23:
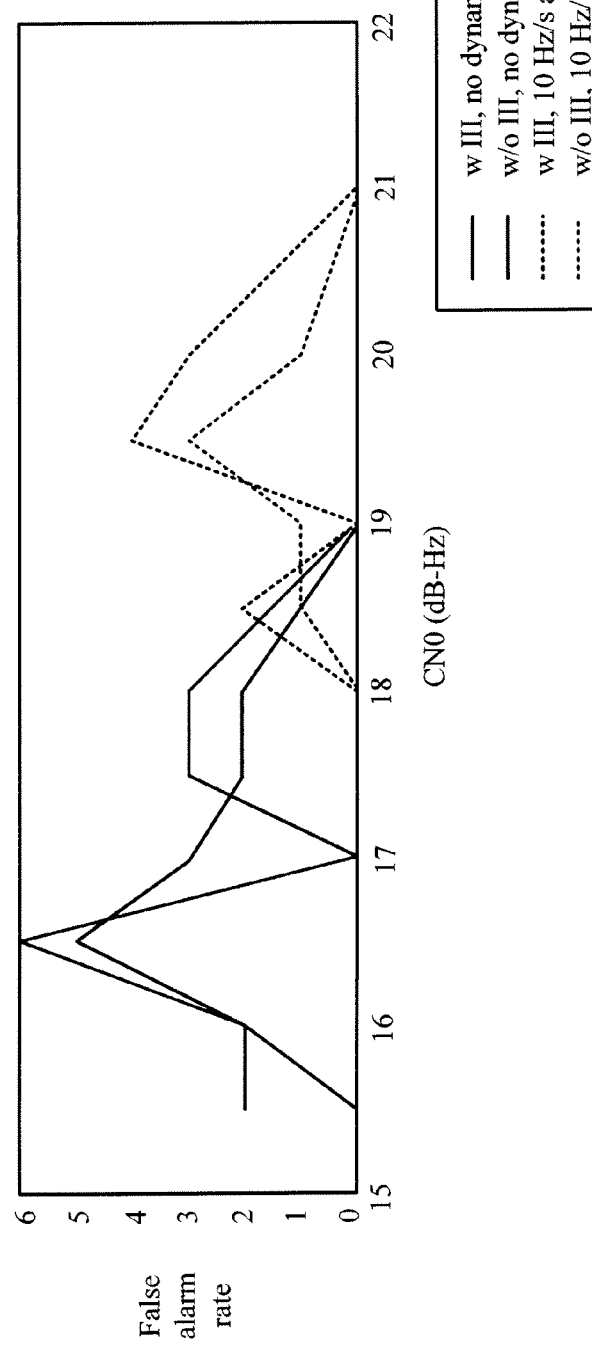

In one embodiment, PDI=10 ms can be used below 24 dB-Hz in stage III to time mark detection. Timeout can be set to 30 sec. FIGS. 22 and 23 illustrate the time mark detection rate and false alarm rate results, respectively, of that embodiment. Without acceleration, there is only 0.23 dB improvement in detection rate and no obvious difference in false alarm rate. With 10 Hz/s acceleration, the performance gain is negligible. Therefore, in one embodiment, stage III can be eliminated to simplify the pull-in design.

The embodiments described herein are not intended to be exhaustive or to limit the invention to the precise forms disclosed. As such, many modifications and variations will be apparent. For example, the technique described in FIG. 19 for GLONASS can be applied to a GPS AFC pull-in procedure, which is shown in FIG. 24.

Figure 24:
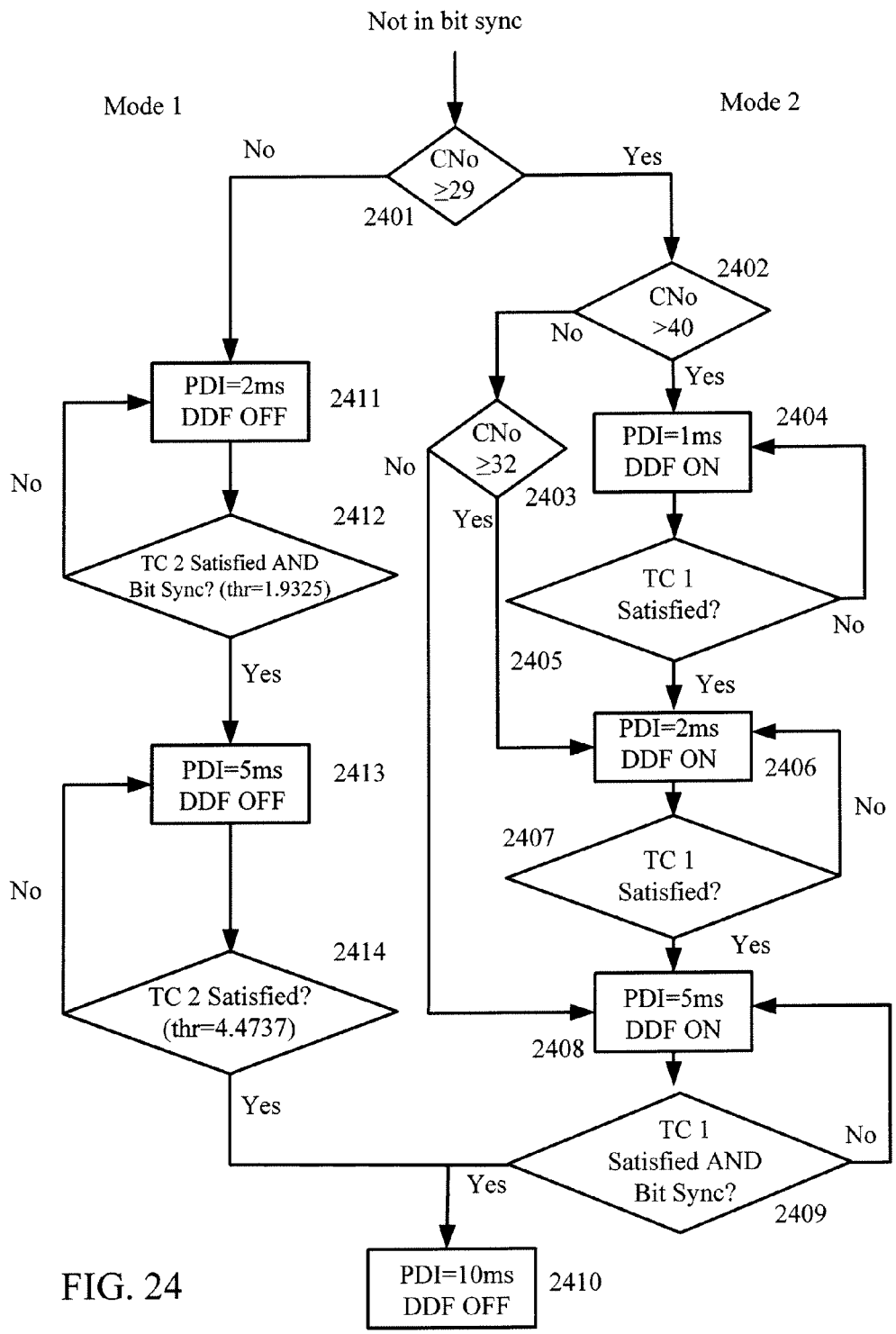

Specifically, FIG. 24 illustrates an exemplary a two-mode, three-stage technique 2400 for a GPS AFC pull-in. Technique 2400 is similar to technique 1900 for GLONASS, but uses CNos and PDI stages appropriate for GPS. In technique 2400, step 2401 determines whether the received bits have a CNo greater than or equal to 29 dB-Hz, thereby indicating a relatively strong signal for GPS. If so, then step 2402 determines whether the received bits have a CNo greater than 40 db-Hz, thereby indicating a very strong signal for GPS. If so, then step 2404 uses a PDI=1 ms and turns DDF ON. Then, step 2405 determines whether both the bad dot count and the afc.freqMS tests, i.e. TC1, are satisfied. As noted above, the bad dot count test counts the number of 'dot<0' events, and afc.freqMS refers to the above described frequency error estimation (Eq. 1). If not, then technique 2400 continues to use PDI=1 ms and DDF ON. If so, then step 2406 uses PDI=2 ms with DDF ON.

Step 2407 then determines whether the first test condition TC1 is satisfied. If not, then technique 2400 continues to use PDI=2 ms and DDF ON. If so, then step 2408 uses PDI=5 ms with DDF ON.

Step 2409 then determines whether the first test condition TC1 is satisfied and whether a bit synchronization has been achieved. Determining bit synchronization is described in detail in U.S. patent application Ser. No. 12/870,533, entitled "GLONASS Bit Boundary Detection", filed on Aug. 27, 2010 by Atheros Communications, Inc., and incorporated by reference herein. If one or both conditions are not satisfied, then technique 2400 continues to use PDI=5 ms and DDF ON. If both conditions are satisfied, then step 2410 uses PDI=10 ms and turns off DDF (DDF OFF).

If the CNo is not greater than 40 dB-Hz, then step 2403 determines whether the CNo is equal to or greater than 32 dB-Hz. (Note that a smaller PDI may lead to a larger frequency pull-in capability, but may require a stronger SNR (CNo) to operate. On the other hand, the frequency error range brought by acquisition is wider in a strong signal and narrower in a weak signal. Therefore, the PDI initial setting can be broken down and a smaller PDI can be applied for a strong signal.) If the CNo is greater than 40 dB-Hz, then technique 2400 proceeds to step 2406 (PDI=2 ms). If not, then technique 2400 proceeds to step 2408 (PDI=5 ms).

Referring back to step 2401, when the received bits have a CNo less than 29 dB-Hz, thereby indicating a weak signal, then step 2411 uses a PDI=2 ms and turns off DDF (DDF OFF). Step 2412 then determines whether the second test condition (TC 2) is satisfied and whether a bit synchronization is achieved. In one embodiment, the second test condition is the above-described frequency lock technique (Eq. 2, using a threshold of 1.9325). If one or both conditions are not satisfied, then technique 2400 continues to use PDI=2 ms and DDF OFF. If both conditions are satisfied, then step 2413 uses PDI=5 ms with DDF OFF.

Step 2414 then determines whether the second test condition T2 is satisfied with a threshold of 4.4737. If T2 is not satisfied, then technique 2400 continues to use PDI=5 ms and DDF OFF. If T2 is satisfied, then step 2410 uses PDI=10 ms with DDF OFF.

Thus, for steps 2402-2409, a frequency error detector using the discriminator output can be used for the stage transition decision. In contrast, for steps 2411-2414, a frequency lock based detector can be used for the stage transition decision. Note that DDF ON is used for steps 2402-2409, whereas DDF OFF is used for steps 2411-2414. Notably, technique 2400 can also be implemented in a GPS GML.

In another embodiment, an AFC step-back mechanism is provided. This AFC step-back can allow a rapid decrease in the AFC PDI value when an extra fast recovery is needed. Various performance checks can be used to monitor abnormalities in the AFC loop, which would necessitate the extra fast recovery.

For example, in a first performance check, a bad Dot count can be monitored. Specifically, a Dot should be positive for strong signal in the final stage, i.e. after the bit boundary and time-marker are detected. Thus, a valid bad Dot count detection could be:

```
When CN0 ≥30dB-Hz,
    if (Dot < 0)
    {
        badDotCount = badDotCount + PDI;
    }elseif (badDotCount > −10)
    {
        badDotCount = badDotCount − PDI;
    }
    if (badDotCount ≥70)   ->   claim 'badDotCount' check
    failure.
```

In a second performance check, the AFC (mean square) can be monitored. Specifically, when the afc.freqMS measured by Eq. 1 becomes larger than the threshold for that particular PDI, an afc.freqMS check failure can be triggered.

In a third performance check, the frequency lock can be monitored. In contrast to Eq. 3, a frequency lock detector can be devised for the capability to work for a weak signal. If the 'LCKDTR' detection fails for a large probability, such as when CN0<30 dB-Hz and CN0>16 dB-Hz $$d.LCKDTR\_DIVG= (sum(LCKDTR(end-29:end))<15)$$

then a frequency lock check failure can be triggered.

In a fourth performance check, alias tracking can be monitored. For example, an AFC loop could track the side lobe of a strong satellite signal. In one embodiment, the detection algorithm of the side-lobe tracking can be based on the power estimation. Assuming that the 1 ms prompt tap signal is P and the noise tap signal is N, then the signal power (SP) can be estimated as:

$$SP=IIR\_filtering(|sum\_PDI(P)/PDI|^2 - |sum\_PDI(N)/PDI|^2)$$

Thus, the wideband signal power (WSP) can be estimated as:

$$WSP=IIR\_filtering(|P|^2) - IIR\_filtering(|sum\_PDI(N)|^2/PDI)$$

In one embodiment, when CN0≥27 dB-Hz, an alias tracking check failure can be triggered when (WSP>2*SP).

Once a check failure is triggered, the AFC loop can step back to a precursor (i.e. smaller) PDI setting and reattempt to pull-in the correct signal frequency. At the same time, the PDI of the DLL and the CNo estimation can also be stepped back to smaller values. (DLL and CNo PDIs advance and retreat with regard to AFC PDI, after the boundary synchronization is achieved. For example, it is set in GLONASS as:

| AFC PDI | 1 ms | 2 ms | 5 ms  | 10 ms |
|---------|------|------|-------|-------|
| DLL PDI | 4 ms | 4 ms | 10 ms | 20 ms |
| CNo PDI | 5 ms | 5 ms | 10 ms | 20 ms |

Note that the AFC could also face the extreme scenarios for sudden and significant receiving signal drops. In one embodiment, a signal strength test can be applied to deal with such scenarios. For example, a very low-pass filtered signal power and noise power can be used to monitor the receiving signal strength. If the very low-pass filtered signal power is smaller than a certain proportion (e.g. a scaling threshold) of that of the noise power, then a significant receiving signal loss is declared. In that case, the AFC loop can be changed to a "coast" state. In this coast state, the AFC loop can be opened, thereby allowing the rate portion (i.e. the integrate memory part) of the loop to slowly decay. If no signal recovery is detected within a predetermined time in the coast state, then the current channel can be dropped.

Accordingly, it is intended that the scope of the invention be defined by the following Claims and their equivalents.

The invention claimed is:

1. A method of providing automatic frequency control pull-in for receipt of GLONASS bits, the method comprising:
   determining, with a GLONASS receiver, whether a channel signal to noise ratio (CNo) is greater than or equal to a predetermined value; and
   when the CNo is greater than or equal to the predetermined value, performing pull-in using a first series of predetection integration periods (PDIs) with an integrator, and activating decision-directed flips (DDFs) until a 20 ms boundary of a GLONASS data bit is found, wherein the activated DDFs adjust polarities of a first value and a second value, which are provided by a real component generator and an imaginary component generator, respectively, based, at least in part, on an output of the integrator.

2. The method of claim 1, wherein using the first series of PDIs and activated DDFs includes proceeding to a next step only when predetermined conditions are met.

3. The method of claim 2, wherein an initial step includes a PDI of 1 ms.

4. The method of claim 3, wherein the initial step transitions to a first step when a test condition is met, and wherein the test condition includes satisfying a dot count test and a transition decision test using frequency error estimation.

5. The method of claim 4, wherein the first step includes a PDI of 2 ms.

6. The method of claim 5, wherein the first step transitions to a second step when the test condition is met.

7. The method of claim 6, wherein the second step includes a PDI of 5 ms.

8. The method of claim 7, wherein the second step transitions to a third step when the test condition is met and a 10 ms GLONASS bit boundary is detected.

9. The method of claim 8, wherein the third step includes a PDI of 10 ms.

10. The method of claim 9, wherein the third step transitions to a fourth step when the 20 ms GLONASS bit boundary is found.

11. The method of claim 10, wherein the fourth step includes deactivating the DDFs.

12. The method of claim 1, wherein when the CNo is less than the predetermined value, using a second series of PDIs with always deactivated DDFs.

13. The method of claim 12, wherein performing the second series of PDIs and deactivated DDFs includes proceeding to a next step only when predetermined conditions are met.

14. The method of claim 13, wherein an initial step includes a PDI of 2 ms.

15. The method of claim 14, wherein the initial step transitions to a first step when a test condition is met and a 10 ms GLONASS bit boundary is detected, wherein the test condition includes a frequency lock test.

16. The method of claim 15, wherein a first step includes a PDI of 5 ms.

17. The method of claim 16, wherein the first step transitions to a second step when the test condition is met and the 20 ms GLONASS bit boundary is detected.

18. The method of claim 17, wherein the second step includes a PDI of 10 ms.

19. A method of providing automatic frequency control pull-in for receipt of GPS bits, the method comprising:
determining, with a GPS receiver, whether a channel signal to noise ratio (CNo) is greater than or equal to a first predetermined value; and
when the CNo is greater than or equal to the first predetermined value, performing pull-in using a first series of predetection integration periods (PDIs) with an integrator, and activating decision-directed flips (DDFs) until a bit synchronization is achieved, wherein the activated DDFs adjust polarities of a first value and a second value, which are provided by a real component generator and an imaginary component generator, respectively, based, at least in part, on an output of the integrator.

20. The method of claim 19, wherein using the first series of PDIs and activated DDFs includes proceeding to a next step only when predetermined conditions are met.

21. The method of claim 20, wherein an initial step includes a PDI of 1 ms.

22. The method of claim 21, wherein the initial step transitions to a first step when a test condition is met, and wherein the test condition includes satisfying a dot count test and a transition decision test using frequency error estimation.

23. The method of claim 22, wherein the first step includes a PDI of 2 ms.

24. The method of claim 23, wherein the first step transitions to a second step when the test condition is met.

25. The method of claim 24, wherein the second step includes a PDI of 5 ms.

26. The method of claim 25, wherein the second step transitions to a third step when the test condition is met and the bit synchronization is achieved.

27. The method of claim 26, wherein the third step includes a PDI of 10 ms and deactivating the DDFs.

28. The method of claim 27, wherein preceding the initial step, further including determining whether the CNo is greater than a second predetermined value, which is higher than the first predetermined value.

29. The method of claim 28, wherein when the CNo is greater than the second predetermined value, then proceeding to the initial step.

30. The method of claim 28, wherein when the CNo is less than or equal to the second predetermined value, then further including determining whether the CNo is greater than or equal to a third predetermined value, which is between the first predetermined value and the second predetermined value.

31. The method of claim 30, wherein when the CNo is greater than or equal to the third predetermined value, then proceeding to the first step.

32. The method of claim 30, wherein when the CNo is less than the third predetermined value, then proceeding to the second step.

33. The method of claim 19, wherein when the CNo is less than the first predetermined value, using a second series of PDIs with always deactivated DDFs.

34. The method of claim 33, wherein performing the second series of PDIs and deactivated DDFs includes proceeding to a next step only when predetermined conditions are met.

35. The method of claim 34, wherein an initial step includes a PDI of 2 ms.

36. The method of claim 35, wherein the initial step transitions to a first step when a test condition is met and a bit synchronization is achieved, wherein the test condition includes a frequency lock test.

37. The method of claim 36, wherein the first step includes a PDI of 5 ms.

38. The method of claim 37, wherein the first step transitions to a second step when the test condition is met.

39. The method of claim 38, wherein the second step includes a PDI of 10 ms.

40. A method of providing automatic frequency control pull-in for receipt of GLONASS or GPS bits, the method comprising:
determining, with a receiver, whether a channel signal to noise ratio (CNo) is greater than or equal to a predetermined value;
when the CNo is greater than or equal to the predetermined value, performing pull-in using a first series of predetection integration periods (PDIs) with an integrator, and activating decision-directed flips (DDFs), wherein the activated DDFs adjust polarities of a first value and a second value, which are provided by a real component generator and an imaginary component generator, respectively, based, at least in part, on an output of the integrator; and
when the CNo is less than the predetermined value, performing pull-in using a second series of PDIs with the integrator, and deactivating the DDFs.

* * * * *